United States Patent
Jiang et al.

(10) Patent No.: US 9,755,512 B2
(45) Date of Patent: Sep. 5, 2017

(54) DIGITAL AUTO COMPENSATION FOR VOLTAGE REGULATORS

(71) Applicant: INTERSIL AMERICAS LLC, Milpitas, CA (US)

(72) Inventors: Shuai Jiang, San Jose, CA (US); Zhixiang Liang, San Ramon, CA (US); Jian Yin, San Ramon, CA (US)

(73) Assignee: INTERSIL AMERICAS LLC, Milpitas, CA (US)

( * ) Notice: Subject to any disclaimer, the term of this patent is extended or adjusted under 35 U.S.C. 154(b) by 7 days.

(21) Appl. No.: 14/853,713

(22) Filed: Sep. 14, 2015

(65) Prior Publication Data
US 2016/0261186 A1     Sep. 8, 2016

Related U.S. Application Data

(60) Provisional application No. 62/128,787, filed on Mar. 5, 2015.

(51) Int. Cl.
*H02M 3/157*    (2006.01)
*H02M 1/00*    (2006.01)

(52) U.S. Cl.
CPC .... *H02M 3/157* (2013.01); *H02M 2001/0025* (2013.01)

(58) Field of Classification Search
CPC ..... H02M 3/156–3/158; H02M 3/1584; G05F 1/56; G05F 1/573; G05F 1/575; G05F 1/5735; H02J 1/102; Y02B 70/1466

USPC .................. 323/265–271, 282–285
See application file for complete search history.

(56) References Cited

U.S. PATENT DOCUMENTS

2007/0139973 A1*  6/2007  Leung ............... H02M 7/219
                                                363/16

* cited by examiner

*Primary Examiner* — Yemand Mehari
(74) *Attorney, Agent, or Firm* — Foley & Lardner LLP; Mark J. Danielson

(57) ABSTRACT

Auto-compensation—for compensating voltage regulators generating a regulated output voltage—may be performed dynamically by determining various coefficients of a compensation function used in compensating the power regulator, based at least on assumptions about the structure of the regulator and corresponding filters. At least the DC loop gain and the position of the compensation zeros may be determined without requiring any prior knowledge of the values of the various components of the system. The compensator coefficients may be adjusted based on duty-cycle jitter information, which may be accurately obtained/measured at a high signal-to-noise ratio. By observing the duty-cycle jitter, the capacitor (equivalent series resistance) may be optimally compensated by tuning the 0 dB crossover slope of the loop gain. Accordingly, auto-compensation may be performed by measuring the duty-cycle jitter while maintaining optimum stability and transient performance.

20 Claims, 26 Drawing Sheets

DIGITAL AUTO COMPENSATION FOR VOLTAGE REGULATORS

PRIORITY CLAIM

This application claims benefit of priority of U.S. Provisional Patent Application Ser. No. 62/128,787 titled "Digital Auto Compensation for Power Converters", filed on Mar. 5, 2015, which is hereby incorporated by reference as though fully and completely set forth herein

FIELD OF THE INVENTION

This invention relates to compensation of feedback systems, and more particularly to digital auto-compensation in digital voltage regulators.

BRIEF DESCRIPTION OF THE DRAWINGS

The foregoing, as well as other objects, features, and advantages of this invention may be more completely understood by reference to the following detailed description when read together with the accompanying drawings in which.

Figure 1:
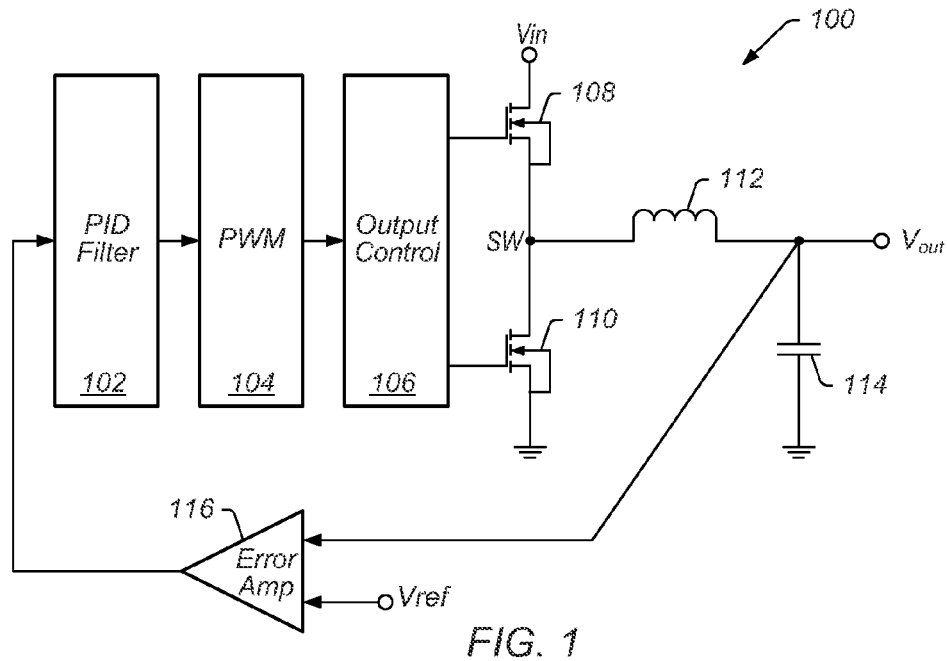
FIG. 1 shows an exemplary circuit diagram of a voltage regulator, according to prior art.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must).

DETAILED DESCRIPTION OF PREFERRED EMBODIMENTS

DC-to-DC Conversion

DC-to-DC conversion is often performed by switching voltage regulators converting a higher voltage (e.g. 12V) to a lower value as required by one or more load devices. A common architecture features distribution of the higher voltage to multiple voltage regulators (also referred to herein and throughout as voltage regulators), each producing a different (or possibly the same) voltage to one or more loads. Switching voltage regulators often use two or more power transistors to convert energy at one voltage to another voltage. One common example of such a voltage regulator 100, commonly called a "Buck Regulator" is shown in FIG. 1. Buck Regulator 100 typically switches a pair of power transistors (108 and 110) in order to produce a square-wave at their common node SW. The produced square-wave can be averaged and filtered using an LC circuit comprising inductor 112 and capacitor 114 to produce the desired DC voltage, $V_{out}$. A control loop, comprised of an Error Amplifier 116, a Proportional-Integral-Differential (PID) Filter 102, a Pulse-Width-Modulator (PWM) 104, and an Output Control circuit 106, can be configured to control the duty-cycle of the output square-wave, and hence the resulting value of $V_{out}$.

For analog control, Type III compensation has typically been a popular choice for compensation of voltage mode switching power supplies. Many types and variations of compensation are available for digital control, but one of the most popular has been digital PID compensation, indicated in FIG. 1 by PID Filter 102, which may be configured to perform digital compensation and/or filtering in Regulator 100. In general, digital power control has been used in various instances in the power industry for some time. As the cost of digital controllers decreases, their increased use becomes more apparent.

Semiconductor process technology has developed to the point that digital circuitry definitely has a size advantage over analog circuitry. For example, an entire digital microcontroller may be built to the approximate size of a single (small) analog component: a capacitor. In addition, digital technology offers the potential to integrate and incorporate sophisticated control algorithms, which may simply be too complex, too large, or too expensive to implement as analog designs. An example of this problem is illustrated in "optimized dead-time control" or ODTC. ODTC is an innovative search algorithm, which adjusts the switching dead-times to optimize the efficiency of the voltage regulator. Although analog implementations of "adaptive dead-time" have been around for some time, they did not include efficiency optimization but merely the prevention of cross conduction.

Another essential element of power supply operation is stability. Because of the complexity of the system stability under poorly defined (or even poorly understood) load and environmental conditions, compensation for stability may well be one of the areas where digital implementation may provide a decided advantage over analog solutions. Because of the computational efficiency and power of digital control, compensation is an area where digital solutions may have a distinct performance advantage over analog implementations.

As previously mentioned, one example of a feedback system may be directed to DC-to-DC conversion, which may be performed by a switching power regulator using two or more power transistors, which may operate to convert energy at one voltage to another voltage. In general, the terms "voltage regulator" and "power converter" used herein are used interchangeably to refer to a device configured to deliver current to a load through a regulated output voltage. Such a voltage regulator or power converter may perform voltage conversion, and may include not only feedback control circuitry, but also additional control circuitry configured to perform one or more functions related to voltage regulation and/or power conversion and control, in addition to performing voltage conversion and providing a regulated output voltage while delivering current to the load. A voltage regulator may also be divided into the voltage converter section, which essentially comprises an output stage of the voltage regulator, and control circuitry, which may comprise all other functionality of the voltage regulator, including the regulating and control functions. The control circuitry may be implemented on an integrated circuit, and coupled to an external output stage to construct a complete voltage regulator. One voltage regulator, a Buck Regulator, was shown in FIG. 1. In general, transistors 108 and 110 may be controlled such that they do not conduct current at the same time. Typically, when transistor 108 is turned on (HS is asserted), transistor 110 may be turned off (LS is de-asserted).

Modeling of the Power Plant

Figure 2:
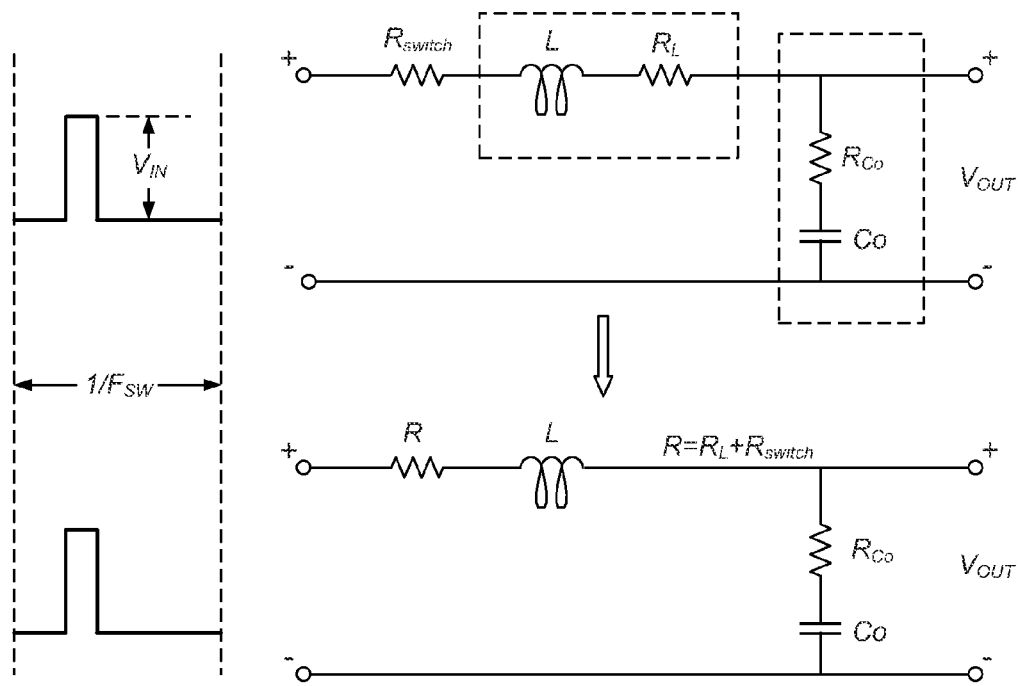
FIG. 2 shows an exemplary circuit representative of a power plant model of a voltage regulator, according to prior art.

FIG. 2 shows the power plant model of a power regulator, such as buck converter 100 from FIG. 1, for example, without a load. The transfer curve of the power plant with no load may be expressed by the following equation:

$$g_{PS}(s) = V_{OUT}(s)/V_{IN}(s) = [1+s/(2*\pi*f_{zesr})]/[1+s/(2*\pi*f_{n,pow}*Q_{pow}) + s^2/(2*\pi*f_{n,pow})^2], \quad (i)$$

where
$f_{n,pow} = 1/[2*\pi*\text{sqrt}(L*C_o)]$,
$Q_{pow} = 1/(2*\zeta_{pow}) = [1/(R+R_{Co})]*\text{sqrt}[L/C_o]$,
$f_{zesr} = 1/[2*\pi*R_{Co}*C_o]$
$Q_{pow}$ and $\zeta_{pow}$ denote the quality factor and damping factor of the power plant respectively, while $f_{n,pow}$ denotes the natural frequency. The term "sqrt" indicates "square root". $F_{sw}$ in FIG. 2 indicates the switching frequency of the switching regulator (converter).

Figure 3:
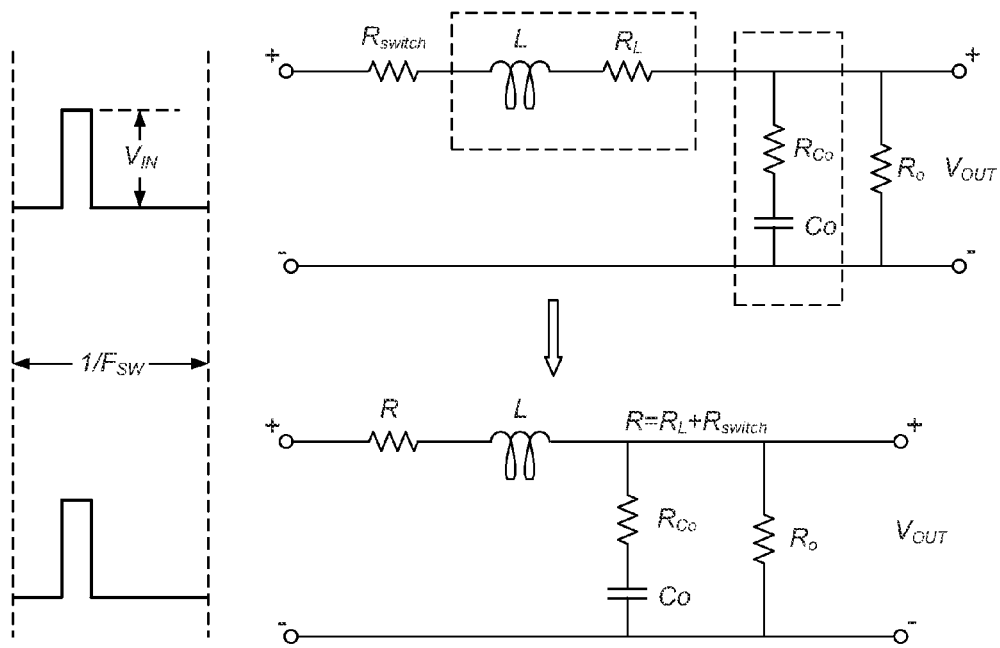
FIG. 3 shows an exemplary circuit representative of a power plant model of a voltage regulator with a load, according to prior art.

FIG. 3 shows the power plant model of a power regulator, such as buck converter 100 from FIG. 1, for example, with a load $R_o$. The transfer curve of the power plant with load $R_o$ may be expressed by the following equation:

$$g_{PS}(s) = [R_o/(R_o+R)]*[1+s/(2*\pi*f_{zesr})]/[1+s/(2*\pi*f_{n,pow}*Q_{pow}) + s^2/(2*\pi*f_{n,pow})^2], \quad (ii)$$

where
$f_{n,pow} = 1/\{2*\pi*\text{sqrt}[(L*C_o)*(R_o+R_{Co})/(R_o+R)]\}$,
$Q_{pow} = \text{sqrt}[(L/C_o)*(R_o+R_{Co})*(R_o+R)]/\{L+C_o*[R_{Co}*(R_o+R)+R_o*R]\}$,
$f_{zesr} = 1/[2*\pi*R_{Co}*C_o]$.

Loop Compensation

Typically, when performing voltage mode control, the compensation function used in the feedback loop of a buck converter introduces a pole near the origin (DC) and two zeroes near the natural frequency $f_{n,pow}$ of the power plant. It may be assumed that the zero due to the capacitor 'esr' (near the frequency $f_{zesr}$) can be ignored due to its high value. Then the compensation function may be rewritten as:

$$g_{comp}(s) = k*[1+s/(2*\pi*f_{n,comp}*Q_{comp}) + s^2/(2*\pi*f_{n,comp})^2]/s \quad (iii)$$

where $f_{n,comp} \cong f_{n,pow}$, with $f_{n,comp}$ representing the compensation frequency. $Q_{comp}$ represents the compensation quality factor. Individually, k, $f_{n,comp}$, and $Q_{comp}$ may be considered compensation coefficients, which together determine the DC loop gain and the position of the compensation zeros, effectively determining the compensation of the power plant according to the compensation function expressed in equation (iii). In addition, these compensation coefficients may also together determine the position of compensation poles of the power plant according to the compensation function expressed in equation (iii). This compensation function may therefore achieve high loop gain, e.g. high loop gain at DC where regulation takes place, low loop gain at high frequencies where noise needs to be attenuated, and simple loop transfer curve that looks like a single pole near the origin (DC).

Conventional Compensation and Auto-Compensation

Figure 4:
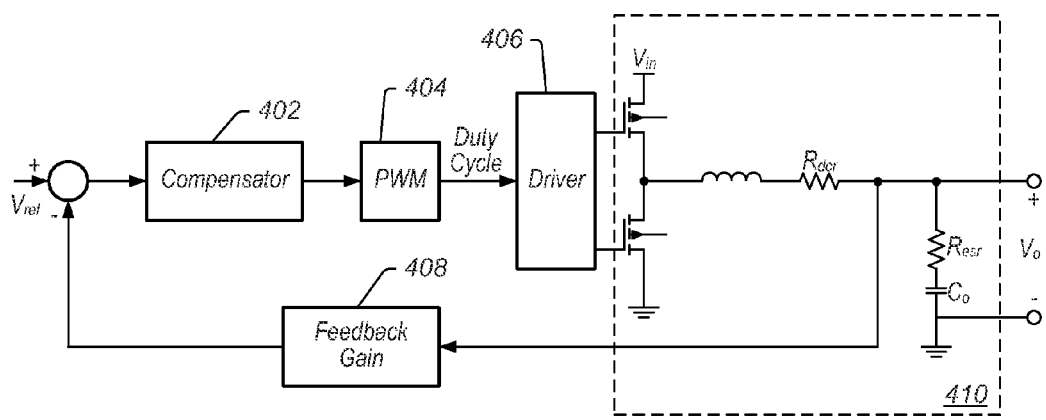
FIG. 4 shows an exemplary circuit diagram of a voltage regulator using a conventional fixed compensator, according to prior art.

FIG. 4 illustrates one example of a voltage regulator using conventional fixed compensation. Specifically, the circuit diagram shown in FIG. 4 is based on a buck converter. A difference signal is generated from a reference voltage $V_{ref}$ and a feedback signal obtained by amplifying (gaining up) $V_o$ in feedback gain circuit 408 (which may be an amplifier, for example). The difference signal is provided to compensator 402, which outputs the control value to PWM signal generator 404 to generate switching signal provided to driver 406, which generates the drive signals for the output transistors in output stage 410.

Conventional voltage regulators using fixed compensation with manually placed compensation parameters, or zeros and poles, come with various disadvantages. For example, the compensator parameters must be individually tuned for each different application or design. In addition, power stage circuit parameter variation cannot be modeled and compensated, and applications that require a wide operation range of input, output, switching frequency, capacitor combinations, such as integrated power modules, fixed compensation cannot be optimized for all conditions. For higher level system integration, oftentimes only very limited flexibility can be provided to system designers to adjust the compensator. Transient performance is often sacrificed in these cases. Finally, extensive efforts are often spent on compensator tuning, which can easily result in longer design-to-market time span.

To address the above-mentioned drawbacks, auto-compensation techniques for digital power supplies have been developed. Auto-compensation techniques allow for autonomous search for the optimal loop compensation coefficients to achieve good stability and good transient performance without user intervention. Existing auto-compensation techniques either require complex computation (loop gain and phase margin measurement, time domain response calculation, etc.) which is often unrealistic in low cost DC-DC applications, or suffer from the inaccuracy of small-signal state variable measurements. For example, some existing auto-compensated converters rely on measuring the output voltage ripple/oscillation to determine the direction in which the compensator coefficients may need to be adjusted. However, state variables such as output voltage ripples often have very low signal-to-noise ratio (SNR) and can easily be incorrectly measured, which leads to miscalculation of compensator auto-tuning. Furthermore, in many auto-compensation techniques the ESRs of output capacitors cannot be readily modelled. Hence, present day auto-compensation results are oftentimes not optimized.

Particularly, auto-compensation methods proposed in the past have the capability of determining the DC loop gain and the position of the compensation zeros, without requiring any prior knowledge of the system, based on certain assumptions about the system, and the expected operating frequency. In these systems, the selection of the compensation parameters (DC loop gain, position of zeroes) are based on measurement of one or more state variables of the system, for example the measurement of the output voltage of the actual voltage regulator. Furthermore, in such systems, in order to obtain a desired phase margin, or a phase margin within desired limits, selection of the compensation parameters is also made in view of an assumption or advance knowledge about the overall structure of the voltage regulator and filters. That is, while the compensation parameters are selected based on measured state variables, and not based on nominal values derived from a model of the system, they are in addition also selected based on an assumption and/or advance knowledge of the overall filter and voltage regulator structure. For example, if the voltage regulator to be compensated is a Buck converter (e.g. a converter such as the one shown in FIG. 1), with an LC filter structure (e.g. as shown in FIGS. 2 and 3), the compensation parameters are selected accordingly. Therefore, while knowledge of the component values of the filter and converter is not required, knowledge of the structure of the filter and the type of the converter are taken into consideration in selecting the compensation parameters. However, as mentioned above, the accuracy of the measurements required for the selection of the compensation parameters still presents a challenge.

Improved Auto-Compensation

As mentioned above, existing digital auto-compensation techniques for voltage regulators typically require measuring the output voltage ripple/oscillation to determine which direction the compensator coefficients must be adjusted. However, the output voltage signal is often embedded in large switching ripples, and for at least this reason it may be very difficult to measure accurately. The output voltage signal is also subject to change depending on the amount of output capacitance or ESRs (equivalent series resistances).

In one set of embodiments, duty-cycle jitter information may be utilized for adjusting the compensator coefficients, allowing for a high signal-to-noise ratio and the use of accurate measurements. In general, information about one or more parameters of a main control signal (or, depending on the control system, multiple control signals) may be used for adjusting the compensator coefficients, as opposed to using measurement(s) of the output voltage and/or output current. Specifically, in case the control signal is a PWM signal (as in the case of converter 100 shown in FIG. 1, for example), by observing the duty-cycle jitter (of the PWM signal), the capacitor ESR may be optimally compensated as well by optimally tuning the 0 dB cross-over slope of the loop gain. Accordingly, it may be sufficient to measure duty-cycle jitter during the entire auto-compensation procedure, and consistency and robustness of the improved auto-compensation may be confirmed through testing a wide range of output capacitor combinations. In addition, optimum stability and transient performance may be achieved at the end of the auto-compensation process.

For at least the above cited reasons, simple, high performance and reliable auto-compensation may be achieved for voltage regulators. Various embodiments of voltage regulators with improved auto-compensation may include a variety of features. First, information associated with one or more parameters of one or more control signals, e.g. duty-cycle jitter information associated with a PWM control signal may be fed back to the controller for determining the compensator coefficients. Duty-cycle jitter is easy to measure, has very high SNR, and remains consistent from device to device and from application to application. The amount of jitter over the nominal duty-cycle (value) is typically related to the compensator architecture itself and the loop bandwidth, phase margin and gain margin. It is less affected by the power stage parameters such as inductance, capacitance, and ESRs. Therefore, the auto-compensation techniques disclosed herein provide more accurate and reliable results than auto-compensation methods based on state variable measurements. Duty-cycle jitter may be more conveniently measured than any of the state variables. For example, by setting a maximum and a minimum duty-cycle boundary based on the nominal duty-cycle value, the jitter amount or jitter level may be obtained by determining/counting the probability of the duty-cycle value hitting the maximum/minimum boundary. The capacitor ESR zero can be well compensated, offering optimum stability and transient performance. ESR zero compensation may be achieved by tuning the loop gain slope around the bandwidth frequency.

As part of the auto-compensation procedure, the converter may first be driven to a very high bandwidth and marginally unstable operating point by adjusting one or two compensator coefficients. The extent of instability may be easily measured by the amount of duty-cycle jitter. Next, the output capacitor ESR may be accurately compensated by actively adjusting the loop gain slope around the bandwidth frequency. Theoretically, smaller loop gain slope around bandwidth frequency leads to higher phase margin and smaller gain margin. On the other hand, steeper loop gain slope around bandwidth frequency represents smaller phase margin and higher gain margin. Inadequate phase margin and/or inadequate gain margin result in instability which is reflected in a high level of duty-cycle jitter. By approximately fixing the loop bandwidth and adjusting the loop gain crossover slope, an optimum slope may be obtained with a duty-cycle jitter value that is at or below a desired/specified threshold value. In this case, output capacitor ESR zero may be well compensated. Finally, after the optimum loop gain cross-over slope is obtained, a final result may be obtained by simply reducing the bandwidth by a specific (specified) ratio.

Figure 5:
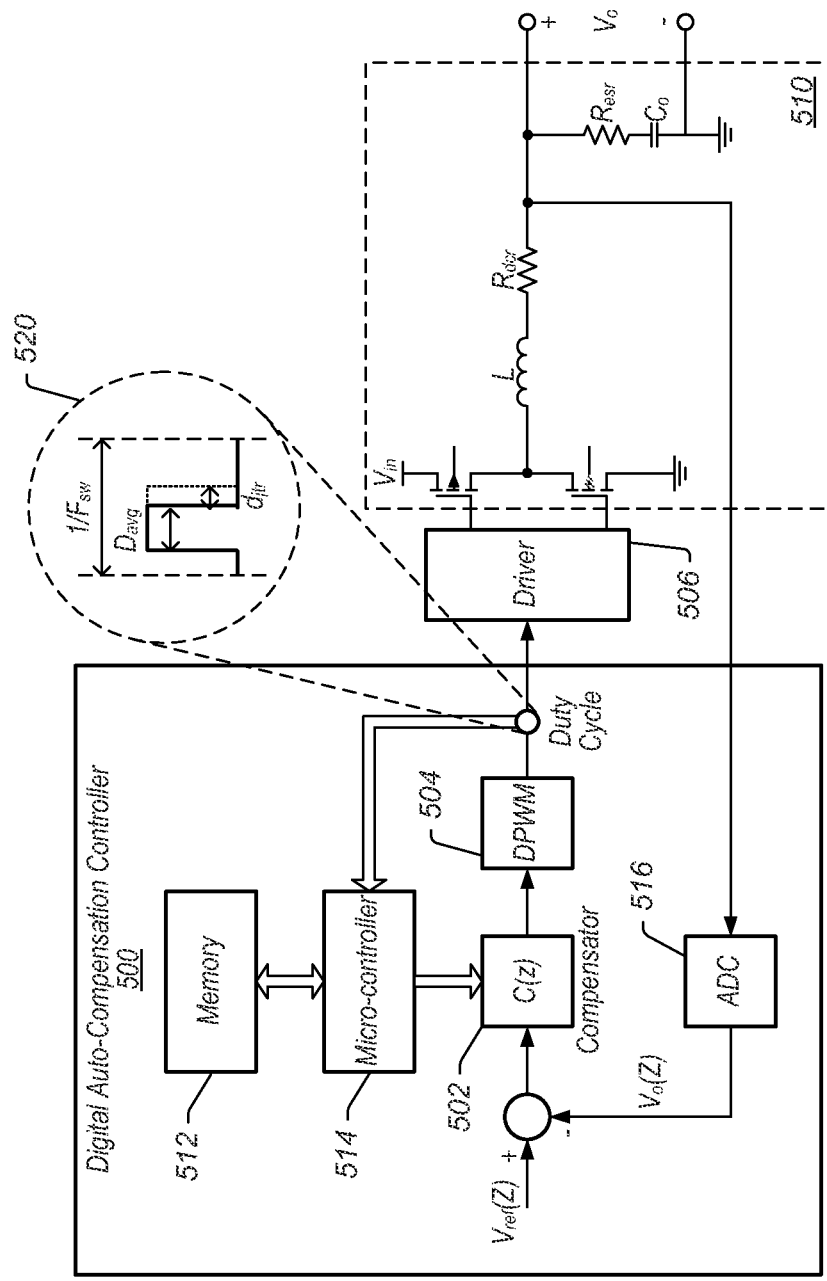
FIG. 5 shows an exemplary circuit diagram of a voltage regulator with improved auto-compensation, according to some embodiments.

FIG. 5 shows an exemplary circuit diagram of a Buck converter implemented with improved digital auto-compensation according to various embodiments. While a Buck converter is used in the circuit of FIG. 5, alternative embodiments may include a different switching converter or converters. The sensed output voltage signal $V_o$ is provided from output stage 510 to an ADC 516 in the digital controller 500 and compared with a reference voltage signal $V_{ref}$ to obtain an error signal. The error signal is then provided to a digital compensator C(z) 502 having (typically) more than two coefficients. In an alternative embodiment, ADC 516 may be implemented as a differential A/D converter which digitizes the difference between $V_{out}$ and $V_{ref}$, and provides a corresponding digital signal directly to Compensator 502. The duty-cycle is obtained from the output of the DPWM (digital PWM signal generating) circuit 504 and provided to the micro-controller 514 for jitter measurements. Jitter may be measured in many different ways. As illustrated in the expanded section 520 in FIG. 5 for a single pulse of the PWM output signal, $D_{avg}$ represents the steady state nominal duty-cycle (value), and $d_{jtr}$ represents the magnitude of the duty-cycle jitter. The microcontroller 514 has access to C(z) 502 for adjusting the compensator coefficients used by compensator 502. A non-volatile memory 512 may be used to store the compensator coefficients generated during the auto-compensation process. In an alternative embodiment, Microcontroller 514 may be replaced by a logic circuit, an FPGA or other suitable digital circuit.

Figure 6:
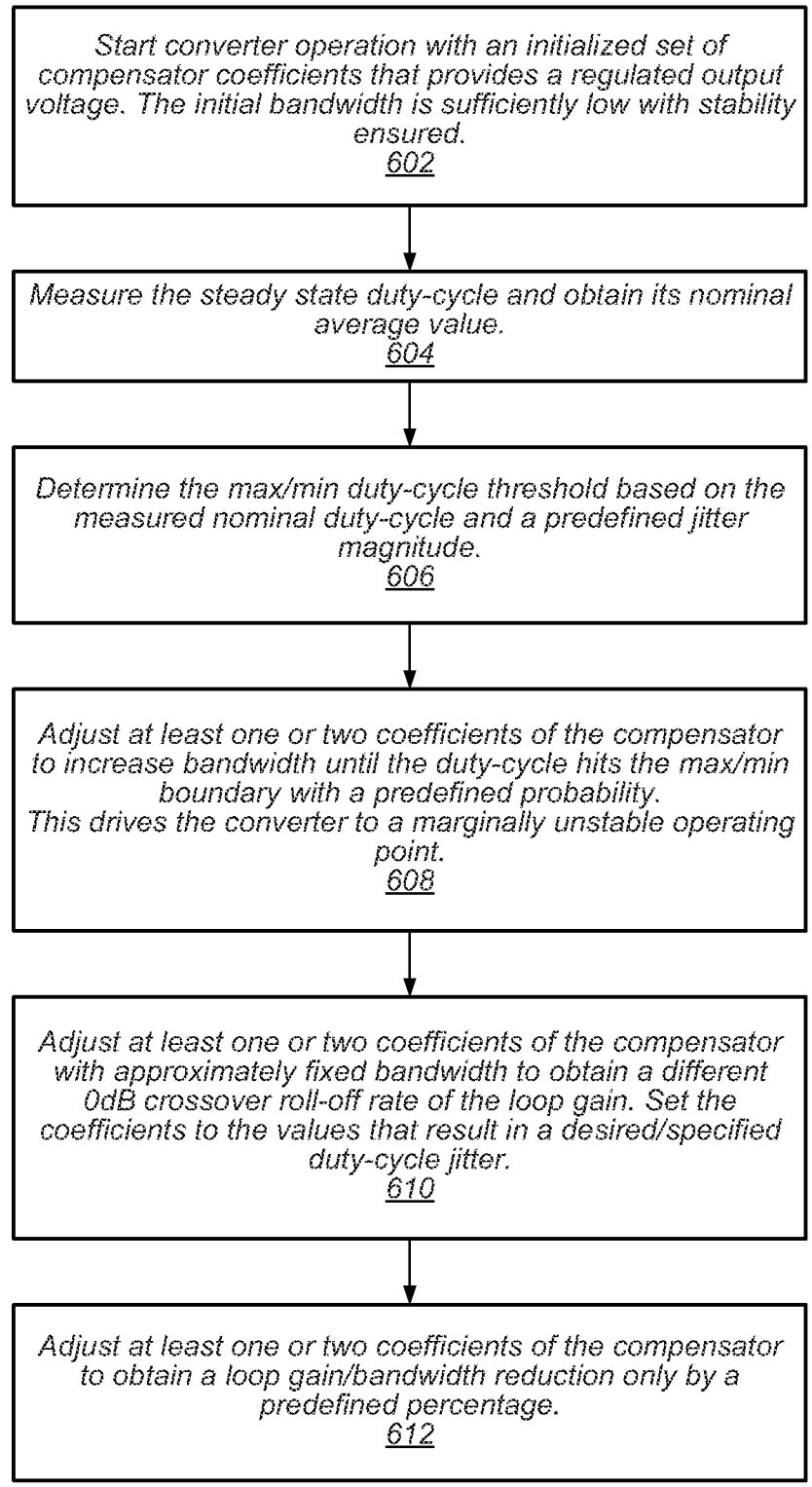
FIG. 6 shows a flow diagram of one example of an improved auto-compensation method, according to some embodiments.

FIG. 6 shows a flow diagram of one embodiment of an improved digital auto-compensation method. It should be noted that as shown in the flow diagram, the maximum/minimum duty-cycle boundary is set to limit the magnitude of the duty-cycle jitter and avoid over-voltage or over-current shut down during auto-compensation. The converter first starts up with an initialized set of PID coefficients that provides a regulated output voltage (602). The initialized PID coefficients may be pre-stored in the controller (e.g. controller 500 in FIG. 5) to ensure stability over a wide range of operating conditions (602). After the converter reaches steady state, the nominal duty-cycle value may be calculated (604), and the maximum/minimum boundary values may be set accordingly with a pre-defined jitter magnitude (606). For example, the maximum boundary value (Max Duty) may be set as a higher-than-one multiple of the nominal average duty-cycle value ($D_{avg}$), e.g. $1.05 * D_{avg}$. The minimum boundary value (Min Duty) may be set as a lower-than-one multiple of $D_{avg}$, e.g. $0.95 * D_{avg}$. The compensator coefficients may be tuned in multiple steps.

As shown in FIG. 6, (for specific, or known values of the external inductive and capacitive elements) a specified number of coefficients, e.g. at least one or two coefficients, of the compensator may be adjusted to push the bandwidth to a specified level at which the duty-cycle jitter has a predefined probability of reaching the maximum/minimum threshold value (608). For example, the bandwidth may be increased to a sufficiently high value that the probability of the duty-cycle jitter reaching the maximum/minimum threshold duty-cycle value is a specified, previously determined probability value. For example, if the duty-cycle has a 50% probability of reaching the maximum/minimum boundary value, that is, there is a 50% probability for the duty-cycle to reach the maximum/minimum threshold value, then the system may be considered to have reached a marginally unstable operating point. In some embodiments, the value of this predefined probability may be obtained based on test results of an actual system.

The specified number of coefficients of the compensator, for example the one or two coefficients of the compensator, may then be adjusted to obtain a different 0 dB crossover slope of the loop gain (610). At 610 the loop bandwidth may be approximately fixed to the level which has been determined in 602. An optimum 0 dB cross-over slope of loop gain may be determined as the loop gain that leads to desired/specified duty-cycle jitter (610). The optimum 0 dB crossover slope of loop gain also means that the capacitor ESR zero is well compensated (neither overcompensated nor under compensated). The specified number of coefficients the compensator may then be adjusted to obtain a loop gain reduction at high frequency (612). The loop gain may be reduced by a predefined ratio. Since the loop gain crossover slope has already been tuned in 610, the gain reduction in 612 may approximately reduce the bandwidth by a same ratio.

Revised PID Compensator

Figure 7:
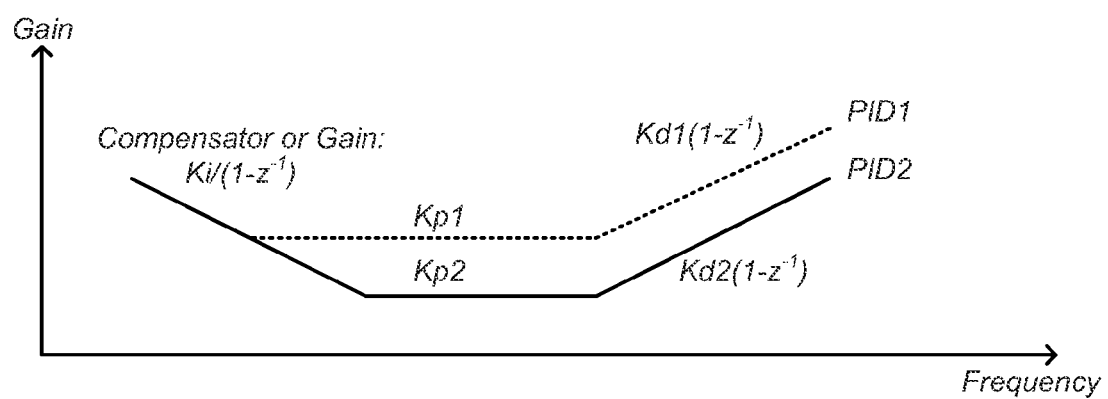
FIG. 7 shows a gain diagram illustrating the frequency response (gain) of one example of a PID compensator, according to some embodiments.

FIG. 7 shows a graph depicting one example of the magnitude-frequency response of a digital PID (proportional integral derivative) compensator according to some embodiments. Ideally, three parameters (Ki, Kp and Kd) may be adjustable for loop response tuning. The loop response (e.g. phase margin, gain margin, bandwidth) at high frequency is affected by Kp and Kd. Hence, when tuning a specified number of compensator coefficients (as described with respect to FIG. 6), at least Kp and Kd, or corresponding parameters, may be tuned. The integral section (determined by Ki) is responsible for low frequency/DC gain and has minimal impact on loop bandwidth, phase margin and gain margin. It may therefore be reasonable to fix Ki to an appropriate value (sufficiently small) that allows for a wide range of operating conditions. On the other hand, adjusting Ki may not in any meaningful way affect duty-cycle jitter, and thus, while tuning Ki during auto-compensation is possible, it may not be necessary to actively tune Ki during auto-compensation.

Equation 1 shown below is the original form of a digital PID compensator.

$$PID(z) = \frac{K_i}{1-z^{-1}} + K_p + K_d(1-z^{-1}). \quad (1)$$

Equation 2 shown below is a revised form of a digital PID compensator.

$$PID(z) = \frac{K_i}{1-z^{-1}} + \alpha(1-\beta z^{-1}) \text{ where } \beta \in [0,1]. \quad (2)$$

Equation 3 shown below is a Laplace form of Equation 2 using discrete-to-continuous domain transformation.

$$PID(s) = \frac{K_i}{sT_s} + \alpha(1-\beta) + \alpha\beta sT_s. \quad (3)$$

$T_s$ is the sampling period, and $\alpha$, $\beta$, and $K_i$ are considered the coefficients of the compensation function represented by equation (3). From this form, $\alpha$ shifts the loop gain at high frequency without affecting the high frequency zero position. $\beta$ is able to adjust both the high frequency loop gain and high frequency zero with approximately fixed bandwidth.

An initial set of PID coefficients may be selected such that stability over a wide range of switching frequency is ensured for specified output inductance and output capacitance values. Input and output voltage operating points may be assumed not to affect loop response for the purposes of selecting the inductance and capacitance values. As the loop response is affected by the product of the output inductance and output capacitance, one of those two parameters may be considered an independent parameter. For example, for analytical purposes (and the sake of simplicity), the inductance may be fixed while a corresponding capacitance value is determined.

Figure 8:
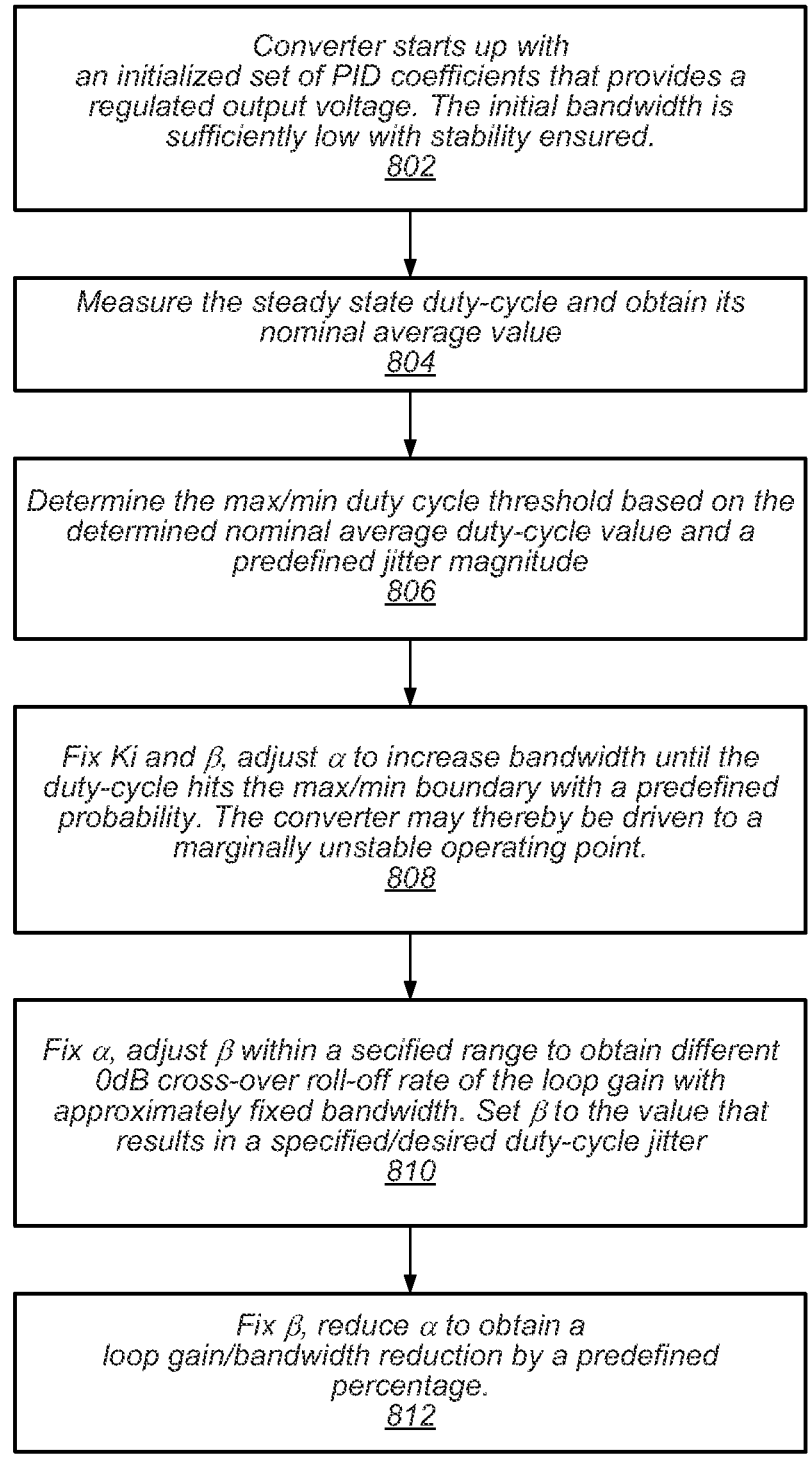
FIG. 8 shows a flow diagram of one example of an improved auto-compensation method with a revised PID compensator, according to some embodiments.

FIG. 8 shows a flow chart of one example of an improved auto-compensation method applied with the revised PID compensator according to some embodiments. It should be noted that the maximum/minimum duty-cycle boundary may be set to limit the duty-cycle jitter magnitude and avoid over-voltage or over-current shutdown during auto-compensation. At 802, the voltage (power) converter may start up with an initialized set of compensator coefficients that provides a regulated output voltage. For example, the converter may be operated with an initial set of PID coefficients. The initial bandwidth may be sufficiently low to ensure stability of the feedback loop. At 804, the steady state duty-cycle value may be measured, and the nominal average value of the duty-cycle may be determined. More generally, the nominal average value of a specified parameter associated with (or corresponding to) a control signal may be determined (804). A maximum/minimum value of the specified parameter, for example a maximum/minimum threshold value of the duty-cycle may be determined based on the determined nominal average duty-cycle value and a pre-defined jitter magnitude (806). The jitter magnitude refers to a magnitude by which the actual value of the duty-cycle may deviate from the nominal average value.

At 808, two coefficient may be fixed and a third coefficient may be adjusted to increase the bandwidth until there is a predefined probability of the duty-cycle value hitting a boundary value such as the maximum and/or minimum threshold value. For example, in reference to equation (3), Ki and $\beta$, may be fixed, and a may be adjusted to increase the bandwidth until the duty-cycle hits the maximum/minimum boundary value with a predefined probability. This may drive the converter to a marginally unstable operating point. Subsequently, at 810, $\alpha$ may be fixed, and $\beta$ may be adjusted within a specified range to obtain a different 0 dB cross-over roll-off rate of the loop gain with approximately fixed bandwidth. Furthermore, $\beta$ may be set to the value that results in a desired/specified duty-cycle jitter, i.e. a value at which the duty-cycle jitter is below a specified (designated) threshold value (810). At 812, $\beta$ may be fixed, and a may be reduced to obtain a loop gain/bandwidth reduction by a specified percentage. In other words, $\beta$ may be fixed, and $\alpha$ may be reduced such that the loop gain/bandwidth is reduced by a specified amount (812).

Figure 9:
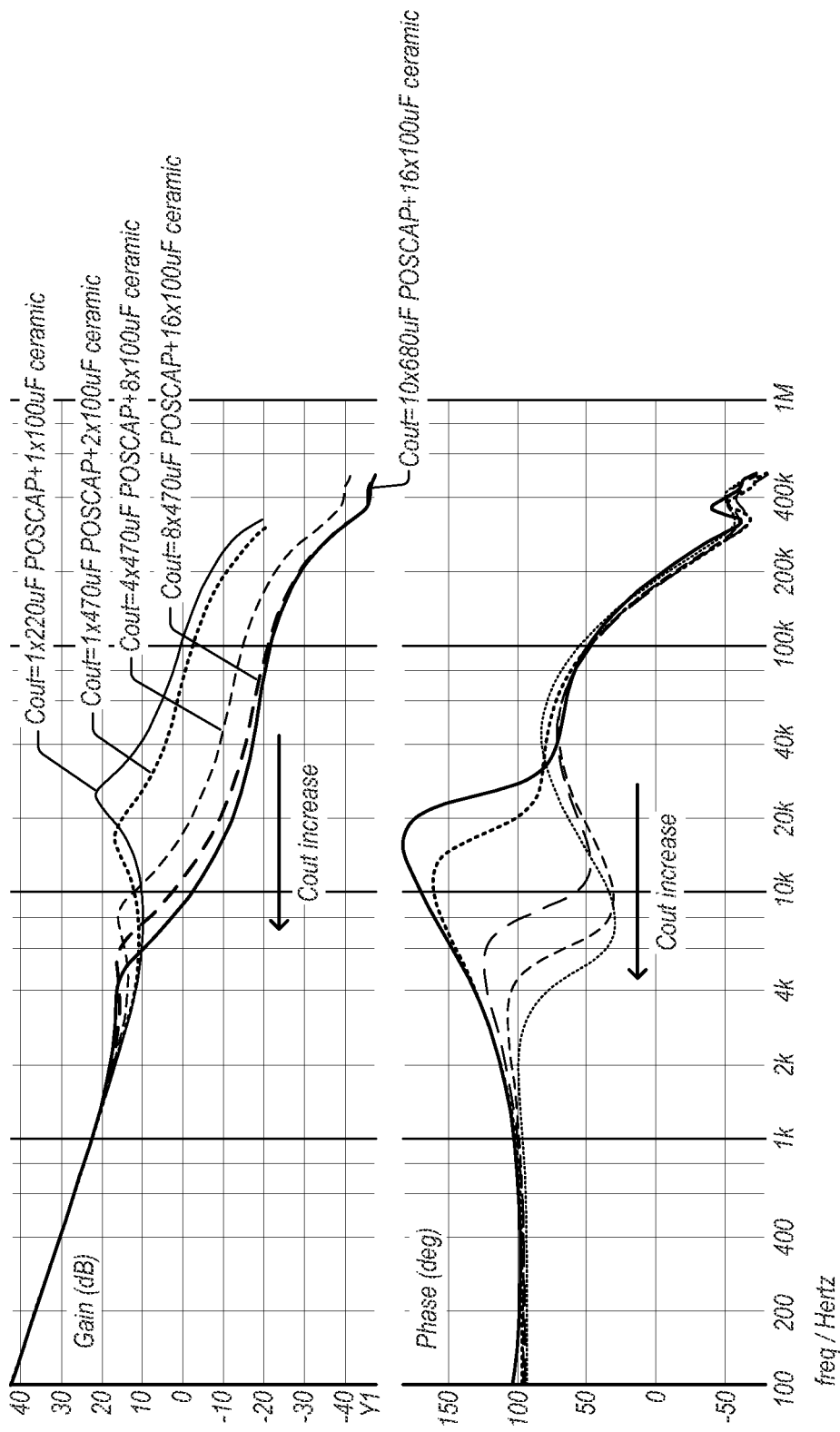
FIG. 9 shows gain and phase diagrams illustrating simulated loop gain and phase response vs. output capacitance, according to some embodiments.

Gain/Phase/Frequency Graphs Illustrating Examples of Converter Operation with Auto-Compensation FIG. 9 shows a Bode plot of loop gain $\beta$ vs. the total output capacitance. It is clear that with a certain set of compensator coefficients, the loop may be driven to instability if the total output capacitance is either above a maximum limit or below a minimum limit. As shown in FIG. 6, Vin=12V, Vout=1V, Fsw=500 kHz, L=270 nH/phase (2-phase configuration), Ki=100, $\alpha$=150, $\beta$=90 (normalized by 128).

Figure 10:
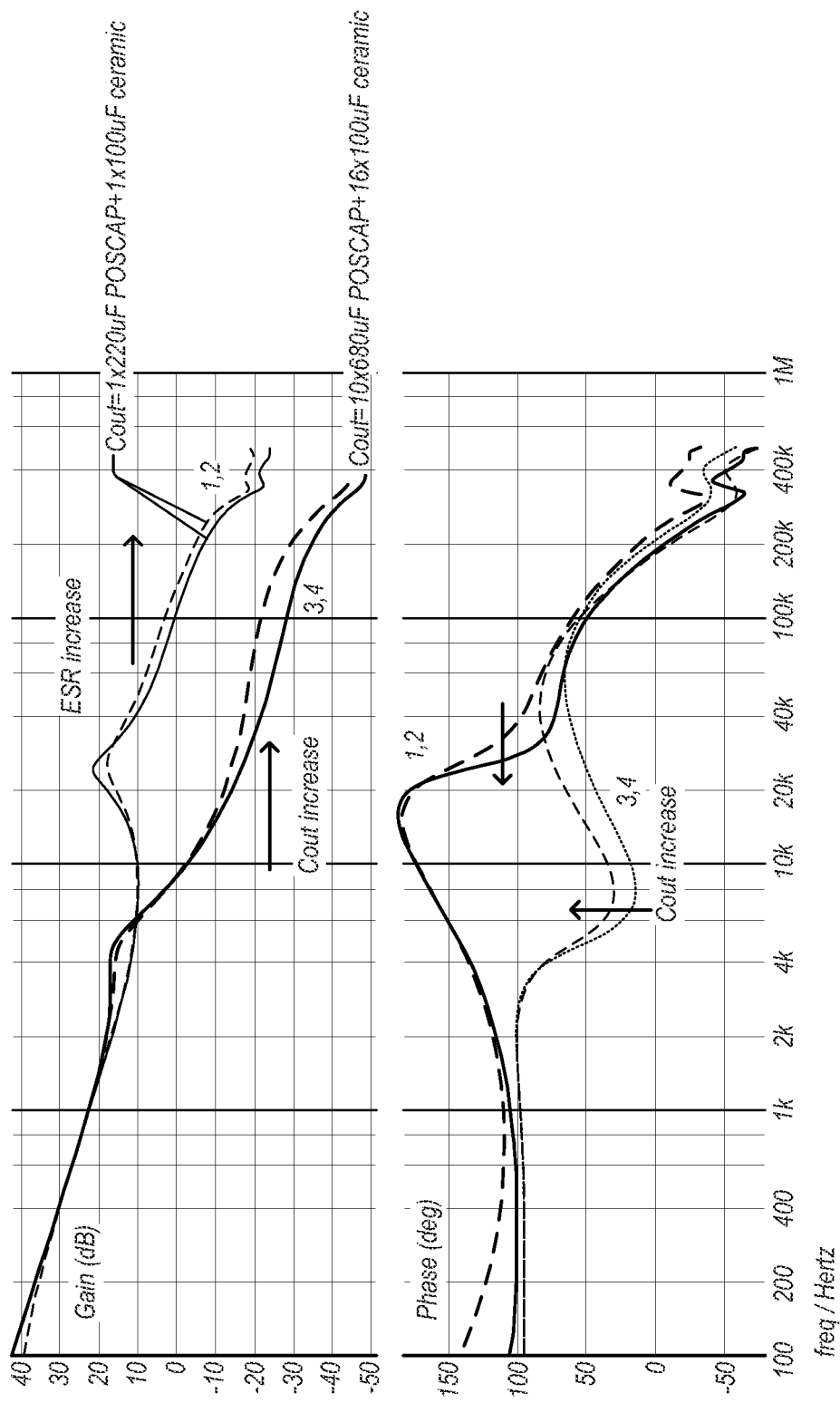
FIG. 10 shows gain and phase diagrams illustrating simulated loop gain and phase response vs. output capacitor ESR, according to a first set of embodiments.

FIG. 10 shows the relationship between the ESR of the output capacitor and the Bode plot of loop gain, according to one embodiment. Specifically, FIG. 10 shows a simulated loop gain and phase response vs. output capacitor ESR. As shown in FIG. 10, Vin=12V, Vout=1V, Fsw=500 kHz, L=270 nH/phase (2-phase configuration), Ki=100, $\alpha$=150, $\beta$=90 (normalized by 128). With minimum capacitance, larger ESR leads to higher bandwidth and higher instability. With maximum capacitance, smaller ESR leads to lower bandwidth and smaller phase margin.

Figure 11:
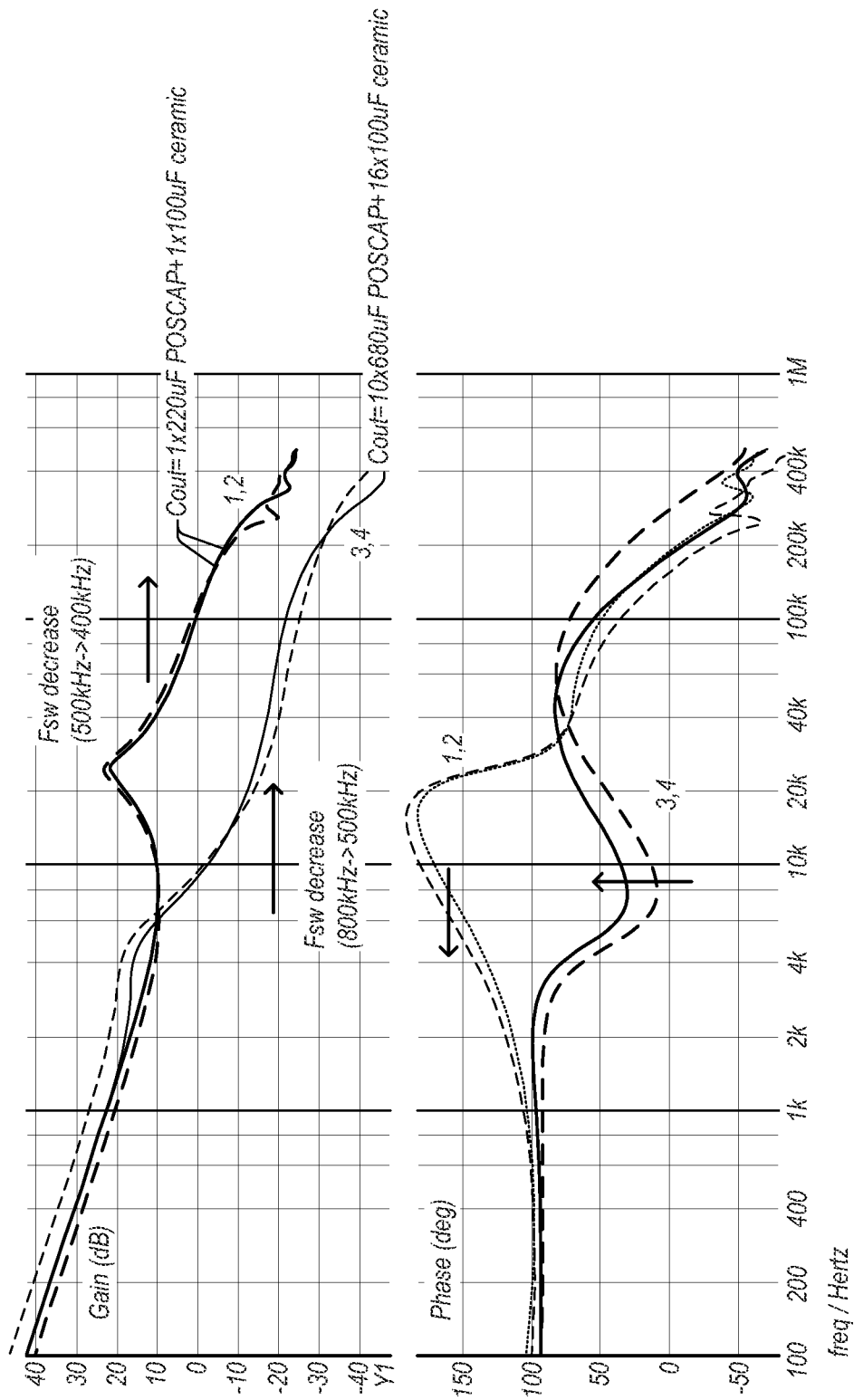
FIG. 11 shows gain and phase diagrams illustrating simulated loop gain and phase response vs. output capacitor ESR, according to a second set of embodiments.

FIG. 11 shows the relationship between switching frequency (proportional to sampling frequency) and the Bode plot of loop gain. Specifically, FIG. 8 shows a simulated loop gain and phase response vs. output capacitor ESR. Vin=12V, Vout=1V, L=270 nH/phase (2-phase configuration), Ki=100, $\alpha$=150, $\beta$=90 (normalized by 128). With minimum capacitance, lower switching frequency leads to higher bandwidth and higher instability. With maximum capacitance, higher switching frequency leads to lower bandwidth and smaller phase margin.

Referring to FIGS. 9-11, the stability criteria may be summarized as follows:

$\alpha$ may be specified to be below an upper limit under small output capacitance, large ESR and low switching frequency.

$\alpha$ may also be specified to be above a lower limit under large output capacitance, low ESR and high switching frequency.

Therefore, the procedure of properly selecting an initial set of $\alpha$ and $\beta$ values for auto-compensation may be summarized as:

(1) Set switching frequency to $F_{sw}$ (min), output capacitance to $C_{out}$ (min), and output capacitor ESR to $R_{esr}$ (max).

(2) Fix β, and find the maximum value of α that still ensures stability.
(3) Fix α and β, change the test condition to $F_{sw}=F_{sw}$ (max), and find the maximum output capacitance $C_{out}$ (max) with $R_{esr}$ (min) that ensures stability.
(4) If the $C_{out}$ (max) found in (3) is not large enough, return to (1) and increase $C_{out}$ (min).
(5) Reiterate (2)-(4) to find the desired initial PID coefficients and $C_{out}$ range. Generally, with a properly selected initial set of α and β, the system stability may be guaranteed over a sufficiently wide operating range.

Figure 12:
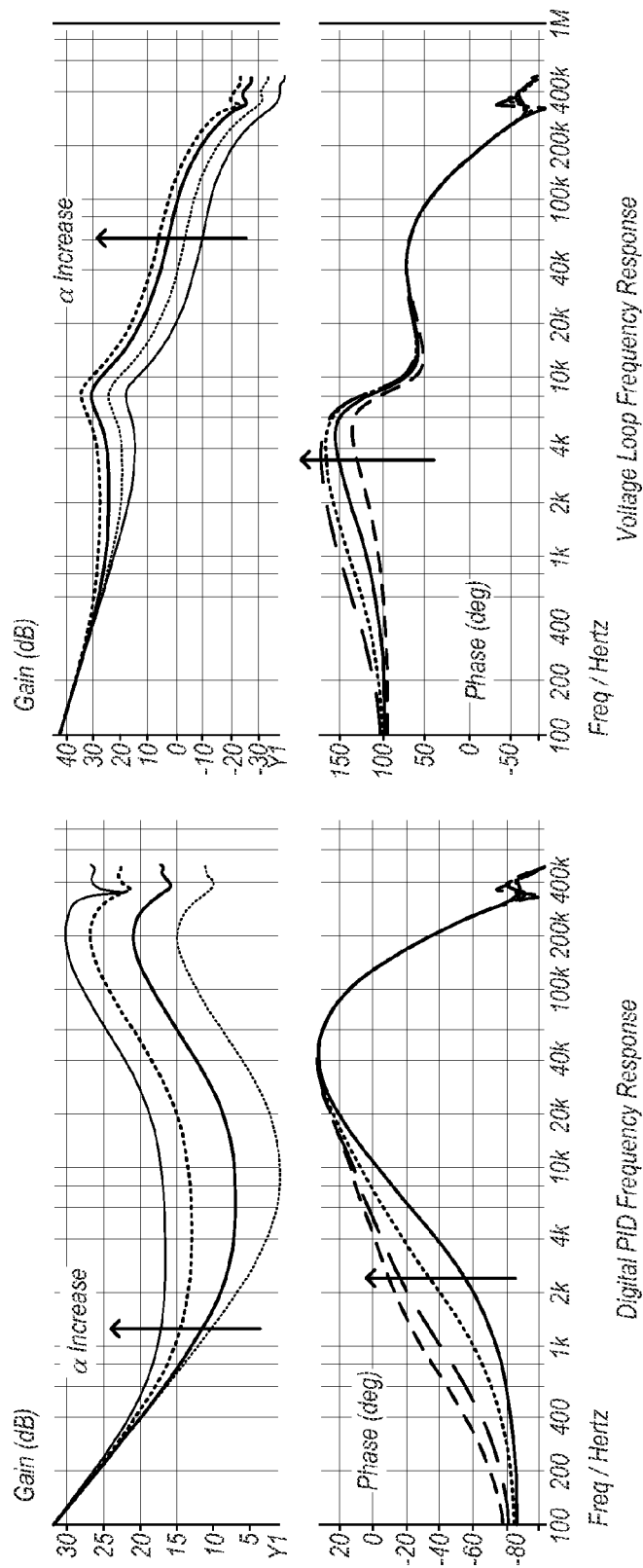
FIG. 12 shows gain and phase diagrams illustrating simulated frequency response of PID only (left) and loop gain (right) with $\alpha$ tuning at Step 1, according to some embodiments.
Figure 13:
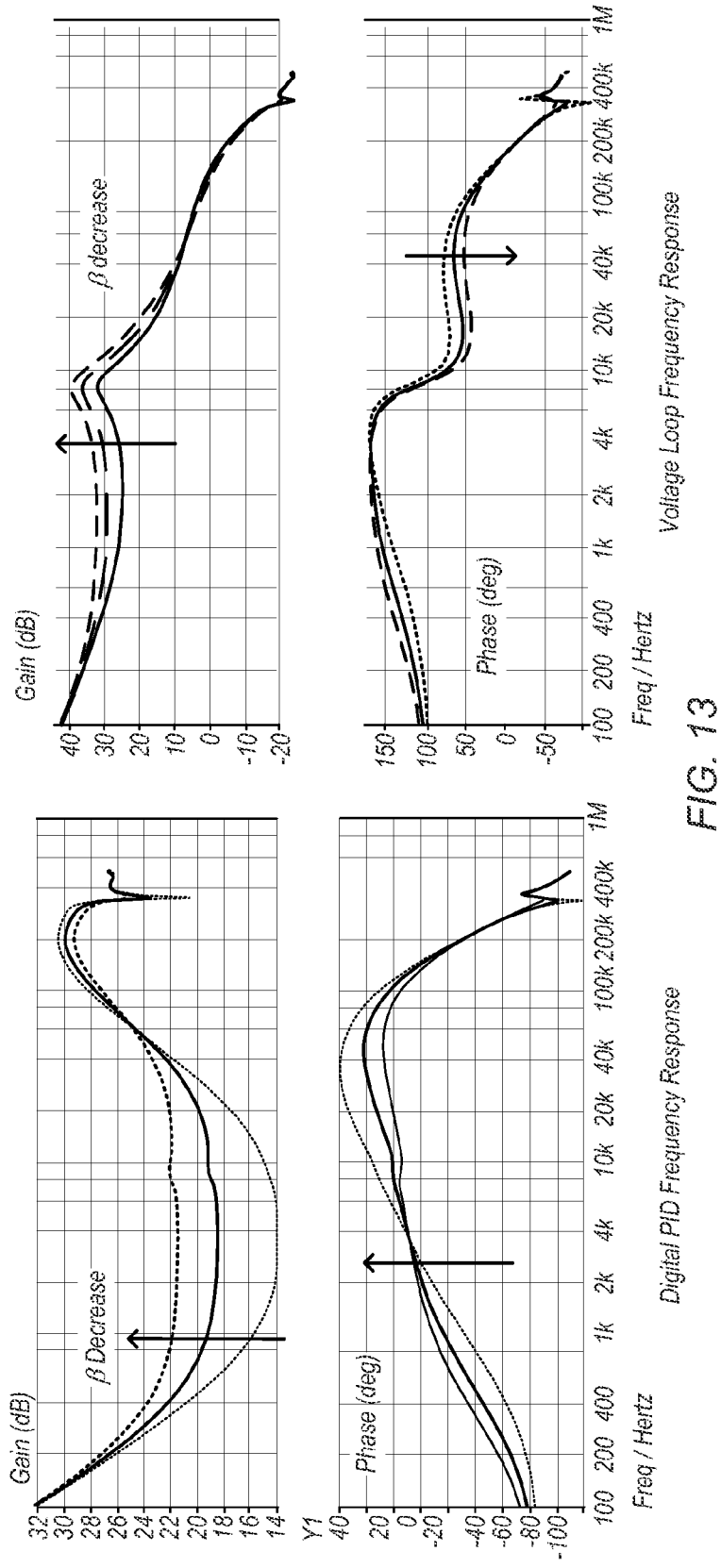
FIG. 13 shows gain and phase diagrams illustrating simulated frequency response of PID only (left) and loop gain (right) with $\beta$ tuning at Step 2, according to some embodiments.
Figure 14:
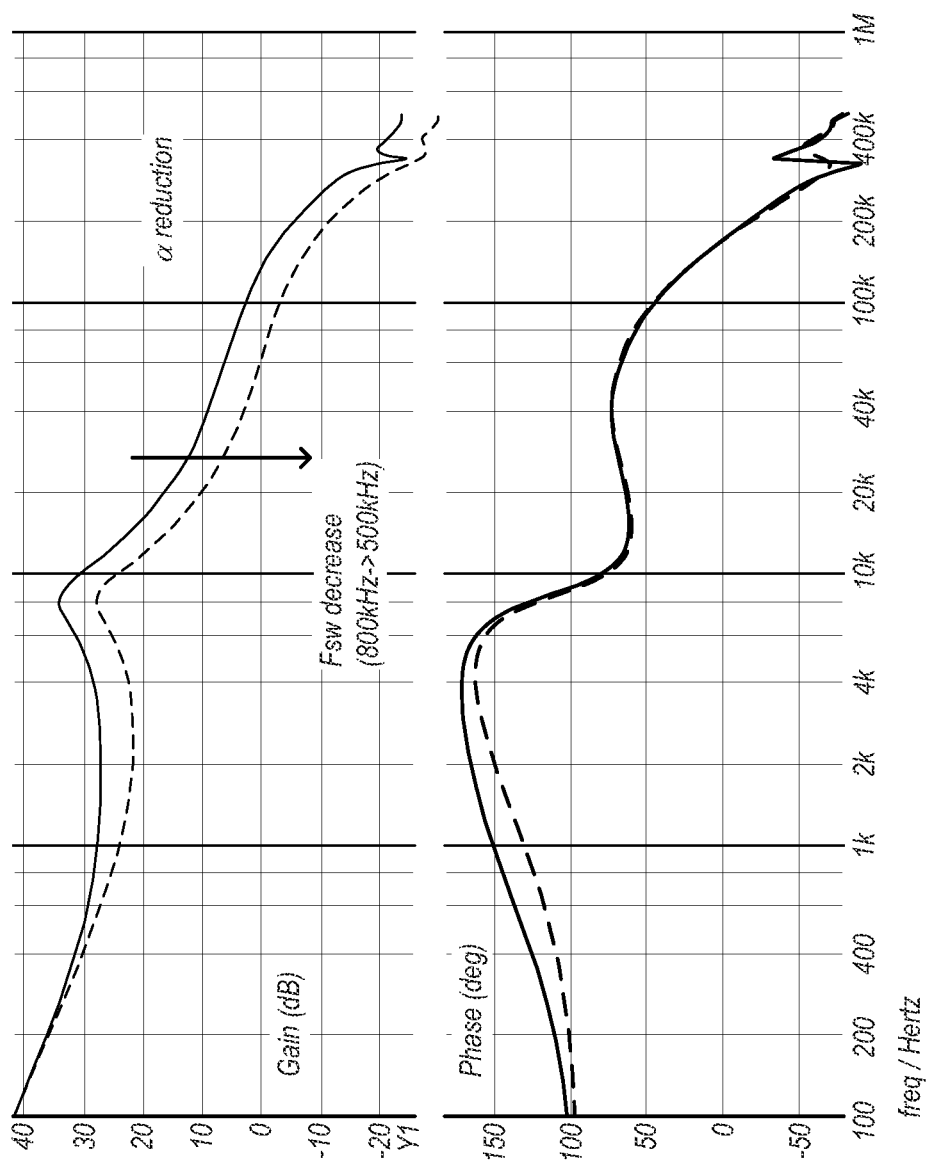
FIG. 14 shows gain and phase diagrams illustrating simulated frequency response of loop gain with $\alpha$ reduction at Step 3, according to some embodiments.

FIGS. 12-14 show respective Bode plots of the PID compensator and loop response at various stages of the compensator auto-tuning exemplified in FIG. 8, according to various embodiments. As illustrated in FIG. 12, β is fixed, while α is adjusted from 200 to 400, 800 and 1200. The compensator gain is shifted up at higher frequencies for obtaining higher loop bandwidth. At some point, the duty-cycle jitter rapidly increases and the converter system becomes marginally unstable (low phase margin, or low gain margin, or both low phase margin and low gain margin). In system implementations, the duty-cycle jitter may be easily quantitatively correlated with the loop bandwidth. Once the duty-cycle jitter exceeds a predefined threshold, α tuning is stopped.

As illustrated in FIG. 13, β is swept in a specified range to tune the 0 dB cross-over slope of the loop gain. In other words, output capacitor ESR zero may be compensated by tuning β. In this procedure, the compensator high frequency zero and loop gain are both adjusted to maintain an approximately fixed loop bandwidth. In case the output capacitor ESR is large, the ESR zero is located at lower frequency. Hence, a flatter loop gain occurs at bandwidth frequency, where gain margin becomes low and phase margin is still adequate (within desired limits). By reducing β, the loop gain slope becomes steeper and the gain margin increases. At the same time, the duty-cycle jitter will decrease. On the other hand, if the output capacitor ESR is very small (for example, all ceramic capacitors are placed at the output), the ESR zero is located at a higher frequency. Hence, a steeper loop gain occurs at bandwidth frequency, where phase margin becomes low and gain margin is adequate. By increasing β, the loop gain crossover slope becomes flatter and the phase margin increases. At the same time, the duty-cycle jitter will decrease. Therefore, adjusting β to search for a specified duty-cycle jitter (that is at or below a specified threshold value) offers an optimal compensation of the ESR zero, or in other words, an optimal cross-over slope of loop gain.

Finally, as illustrated in FIG. 14, β is fixed to a value that results in a specified (e.g. at or below a designated threshold) duty-cycle jitter, and α is reduced by a predefined ratio (e.g., 50%). A desired loop bandwidth, phase margin, gain margin and the final compensator coefficients are obtained. Because the loop gain crossover slope is tuned to be optimal (as illustrated in FIG. 13), reducing α by a predefined ratio results in a bandwidth reduction by an approximate, fixed percentage. This feature makes the auto-compensation results more robust and consistent.

Specifically, FIG. 12 shows a simulated frequency response of PID only (left) and loop gain (right) with α tuning at Step 1. As shown in FIG. 9, Vin=12V, Vout=1V, Fsw=500 kHz, L=270 nH/phase (2-phase configuration), Cout=4×470 uF POSCAP+8×100 uF ceramic. α=200, 400, 800, 1200, β=90 (normalized by 128). FIG. 13 shows a simulated frequency response of PID only (left) and loop gain (right) with β tuning at Step 2. As shown in FIG. 10, Vin=12V, Vout=1V, Fsw=500 kHz, L=270 nH/phase (2-phase configuration), Cout=4×470 uF POSCAP+8×100 uF ceramic. α=1200, β=60, 80, 100 (normalized by 128). FIG. 14 shows a simulated frequency response of loop gain with a reduction at Step 3. As shown in FIG. 14, Vin=12V, Vout=1V, Fsw=500 kHz, L=270 nH/phase (2-phase configuration), Cout=4×470 uF POSCAP+8×100 uF ceramic. α=1200, 600, β=90 (normalized by 128).

Graphs Illustrating Experimental Results

FIGS. 15-26 show experimental verification results for various embodiments of the novel auto-compensation systems and methods described herein. The graphs and diagrams are representative of tests in which two different output capacitor banks are used, respectively. FIGS. 15-20 correspond to test cases in which all-ceramic output capacitors are used. FIGS. 21-26 correspond to test cases in which large ESR POSCAPs are used. In both cases α and β are optimally tuned, and excellent stability and transient performance are achieved.

First Set of Embodiments

Figure 15:
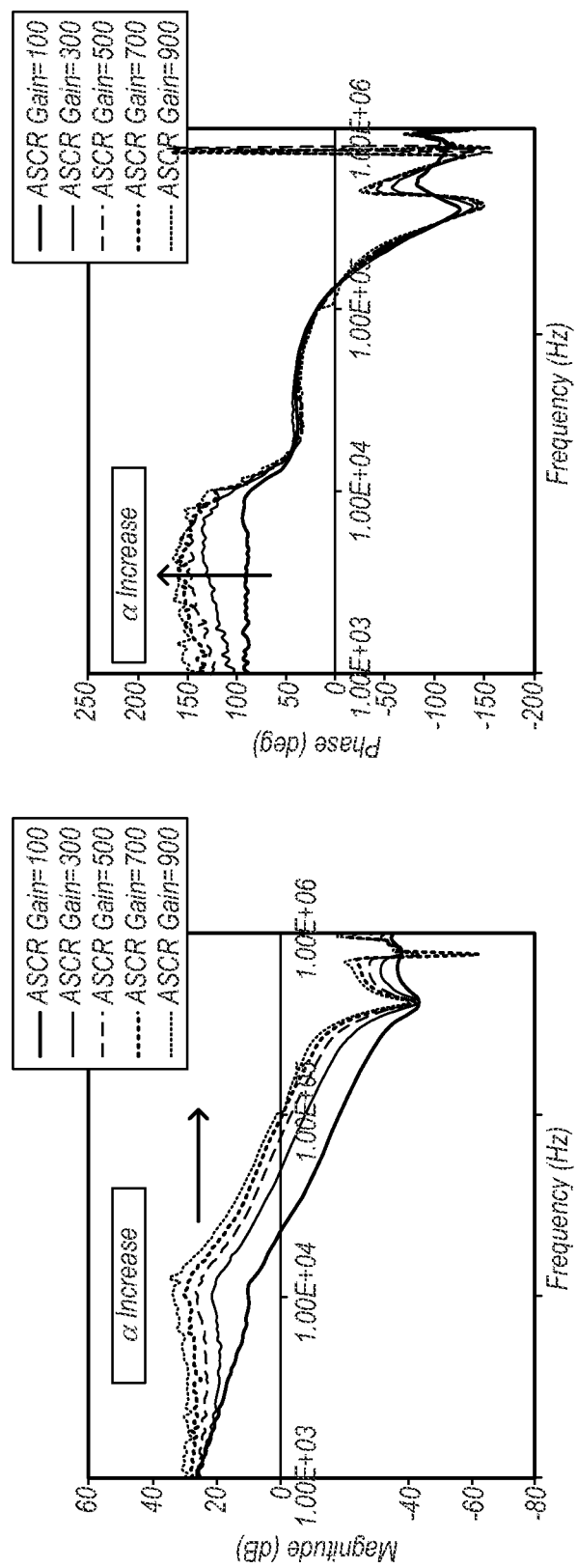
FIG. 15 shows diagrams illustrating the measured frequency response of loop gain with $\alpha$ tuning at Step 1, according to some embodiments.

FIG. 15 shows a diagram illustrating measured frequency response of loop gain with α tuning in a first stage of the auto-compensation process, according to a first set of embodiments. As shown in FIG. 15, $V_{in}$=12V, $V_{out}$=1.2V, $F_{sw}$=420 kHz, L=270 nH/phase (2-phase configuration), $C_{out}$=26×100 uF ceramic. α=100, 300, 500, 700, 900, β=90 (normalized by 128).

Figure 16:
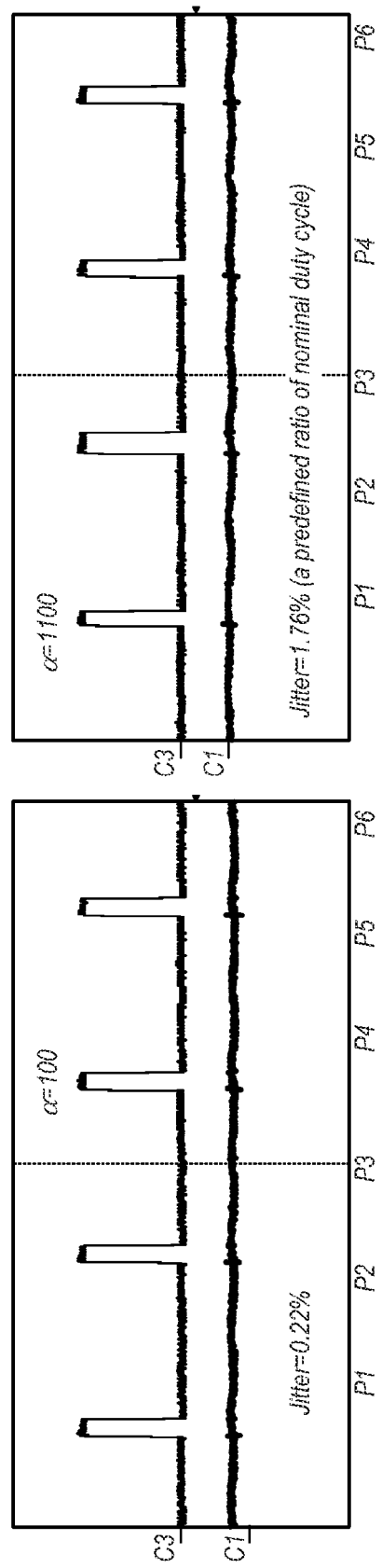
FIG. 16 shows diagrams illustrating the measured duty-cycle jitter at $\alpha$=100 and $\alpha$=1100 at Step 1, according to some embodiments.

FIG. 16 shows a diagram illustrating measured duty cycle jitter at α=100 and α=1100 at the first stage of the auto-compensation process. As shown in FIG. 16, $V_{in}$=12V, $V_{out}$=1.2V, $F_{sw}$=420 kHz, L=270 nH/phase (2-phase configuration), $C_{out}$=26×100 uF ceramic, β=90 (normalized by 128), and α=1100 represents a marginal unstable operating point.

Figure 17:
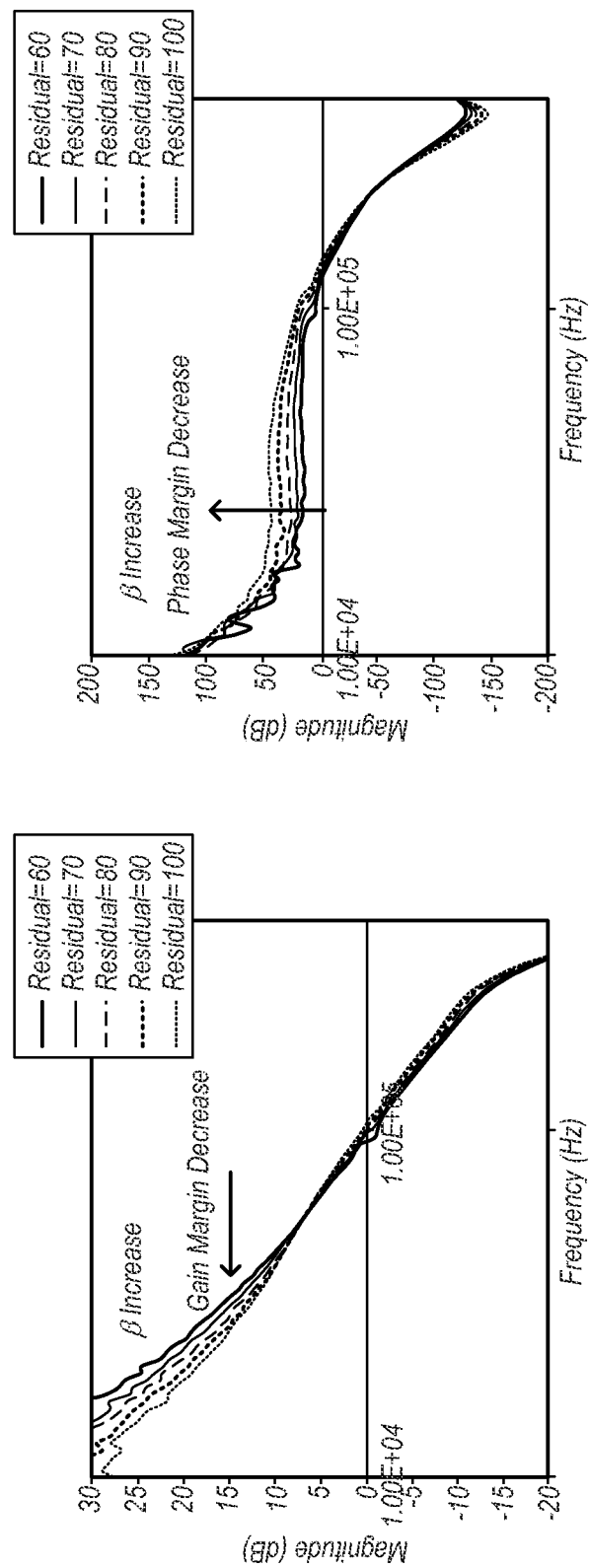
FIG. 17 shows diagrams illustrating the measured frequency response of loop gain with $\beta$ tuning at Step 2, according to some embodiments.

FIG. 17 shows a diagram illustrating measured frequency response of loop gain with β tuning at a second stage of the auto-compensation process. As shown in FIG. 17, $V_{in}$=12V, $V_{out}$=1.2V, $F_{sw}$=420 kHz, L=270 nH/phase (2-phase configuration), $C_{out}$=26×100 uF ceramic, α=750, β=60, 70, 80, 90, 100 (normalized by 128).

Figure 18:
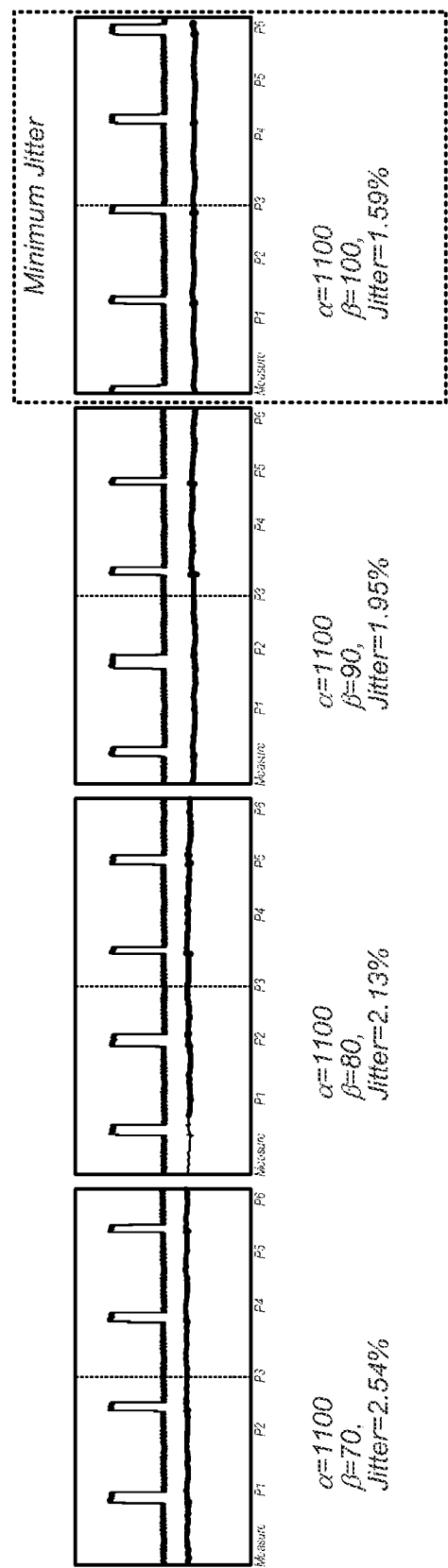
FIG. 18 shows diagrams illustrating the measured duty-cycle jitter at $\alpha$=1100 and $\beta$=70, 80, 90, 100 (normalized by 128) at Step 2, according to some embodiments.

FIG. 18 shows a diagram illustrating measured duty-cycle jitter at α=1100 and β=70, 80, 90, 100 (normalized by 128) at the second stage of the auto-compensation process. As shown in FIG. 18, $V_{in}$=12V, $V_{out}$=1.2V, $F_{sw}$=420 kHz, L=270 nH/phase (2-phase configuration), $C_{out}$=26×100 uF ceramic, and β=100 offers the desired (e.g. at or below a specified threshold) jitter and represents an optimum loop gain cross-over slope.

Figure 19:
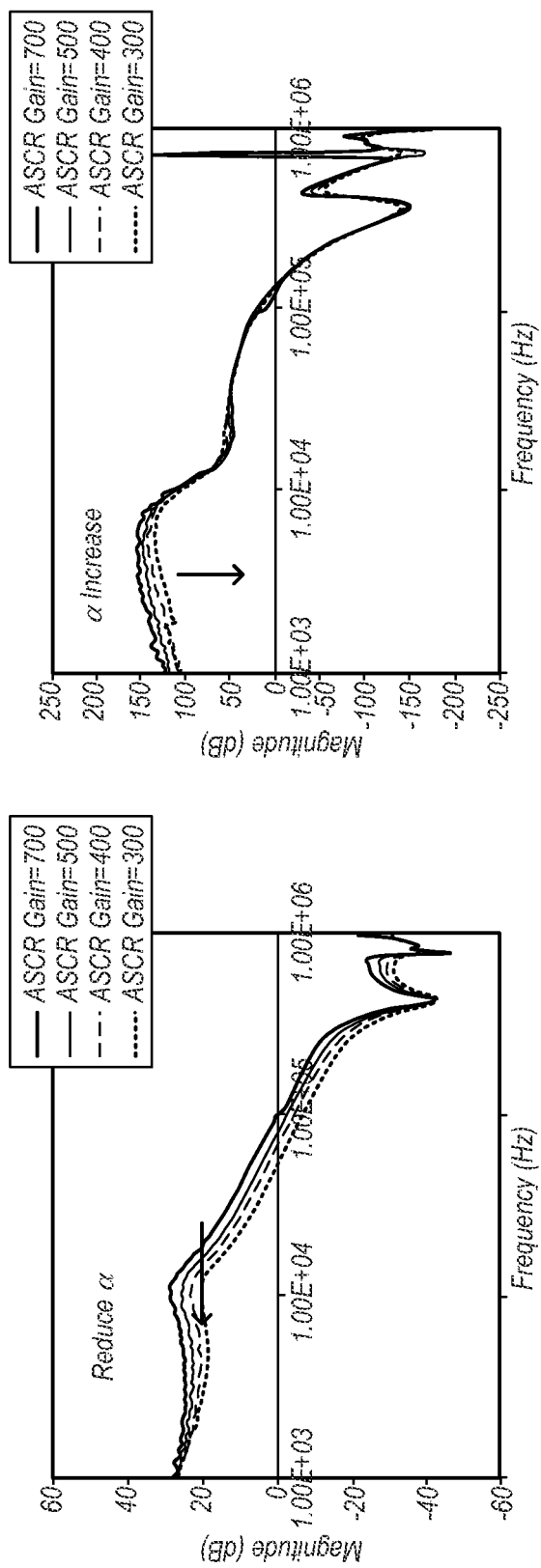
FIG. 19 shows diagrams illustrating the measured frequency response of loop gain with $\alpha$ reduction at Step 3, according to some embodiments.

FIG. 19 shows a diagram illustrating measured frequency response of loop gain with α reduction at a third stage of the auto-compensation process. As shown in FIG. 19, $V_{in}$=12V, $V_{out}$=1.2V, $F_{sw}$=420 kHz, L=270 nH/phase (2-phase configuration), $C_{out}$=26×100 uF ceramic, α=700, 500, 400, 300, and β=100 (normalized by 128).

Figure 20:
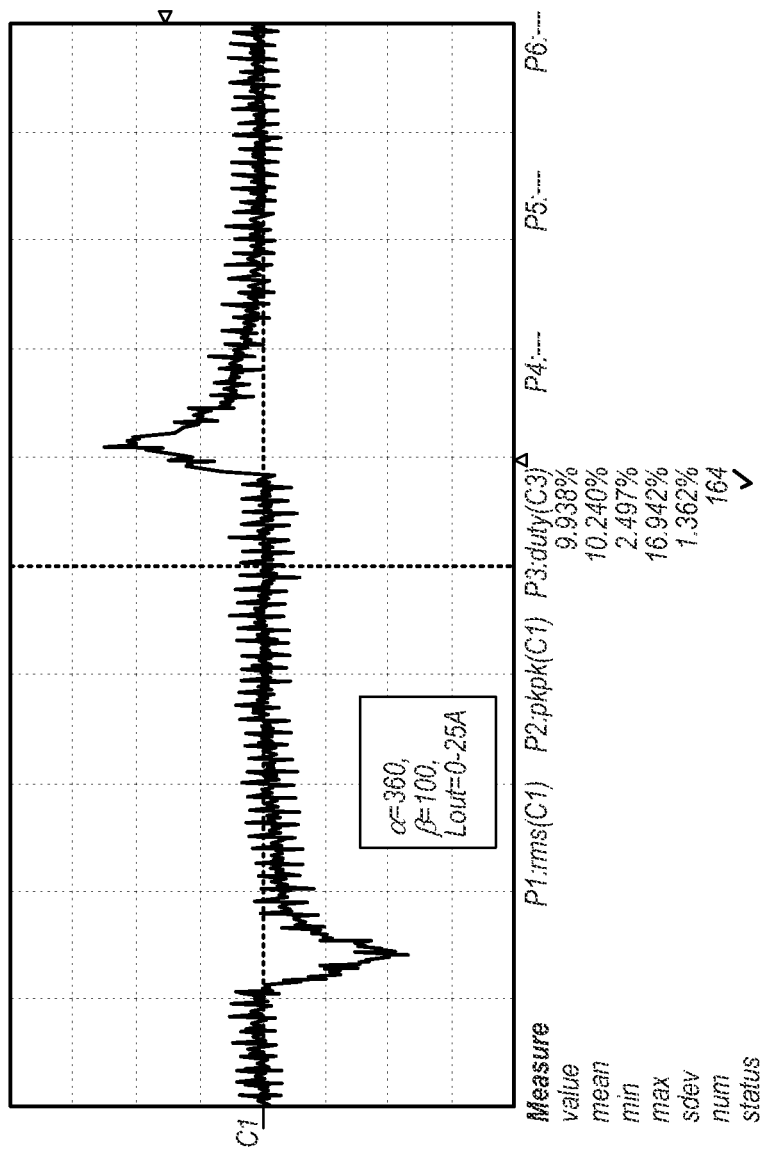
FIG. 20 shows a diagram illustrating the measured load transient response after $\alpha$ reduction at Step 3, according to some embodiments.

FIG. 20 shows a diagram illustrating measured load transient response after α reduction at the thirds stage of the auto-compensation process. As shown in FIG. 20, $V_{in}$=12V, $V_{out}$=1.2V, $F_{sw}$=420 kHz, L=270 nH/phase (2-phase configuration), $C_{out}$=26×100 uF ceramic, α=360, β=100 (normalized by 128).

Second Set of Embodiments

Figure 21:
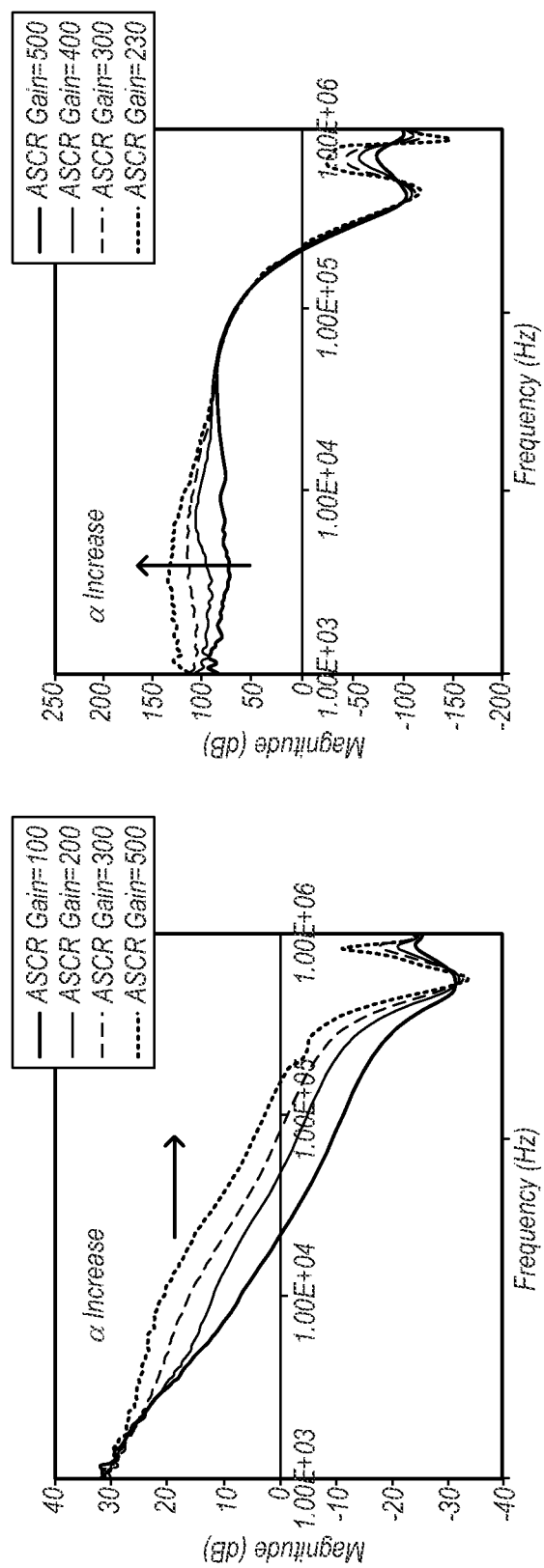
FIG. 21 shows diagrams illustrating the measured frequency response of loop gain with $\alpha$ tuning at Step 1, according to some embodiments.

FIG. 21 shows a diagram illustrating measured frequency response of loop gain with α tuning at the first stage of the auto-compensation process, according to a second set of embodiments. As shown in FIG. 21, $V_{in}$=12V, $V_{out}$=1.2V, $F_{sw}$=533 kHz, L=270 nH/phase (2-phase configuration), $C_{out}$=4×100 uF POSCAP+6×100 uF ceramic, α=100, 200, 300, 500, and β=90 (normalized by 128).

Figure 22:
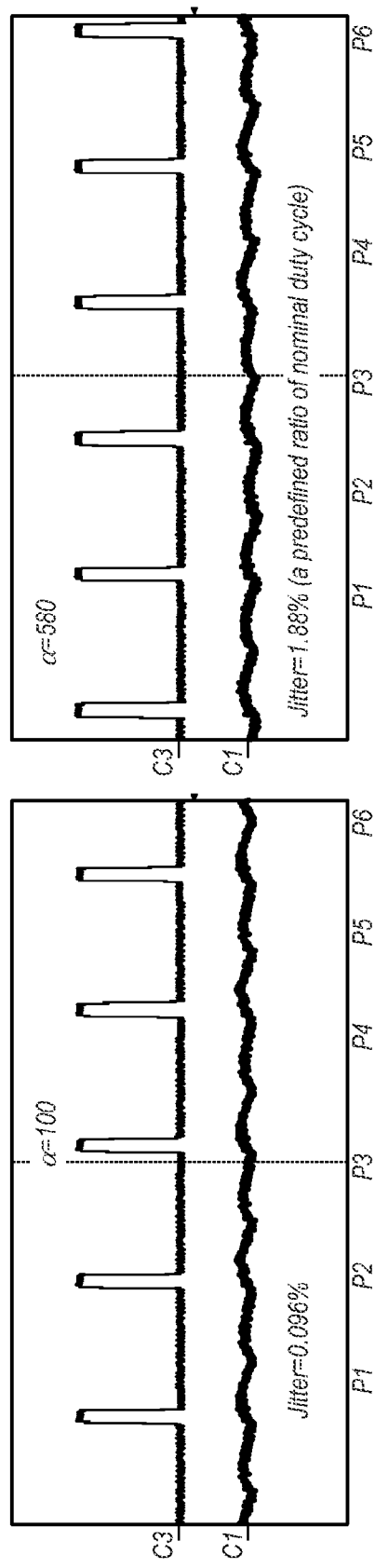
FIG. 22 shows diagrams illustrating the measured duty-cycle jitter at $\alpha$=100 and $\alpha$=580 at Step 1, according to some embodiments.

FIG. 22 shows a diagram illustrating measured duty cycle jitter at α=100 and α=580 at the second stage of the auto-compensation process. As shown in FIG. 22, $V_{in}$=12V, $V_{out}$=1.2V, $F_{sw}$=533 kHz, L=270 nH/phase (2-phase configuration), $C_{out}$=4×100 uF POSCAP+6×100 uF ceramic, and β=90 (normalized by 128). α=580 represents a marginally unstable operating point.

Figure 23:
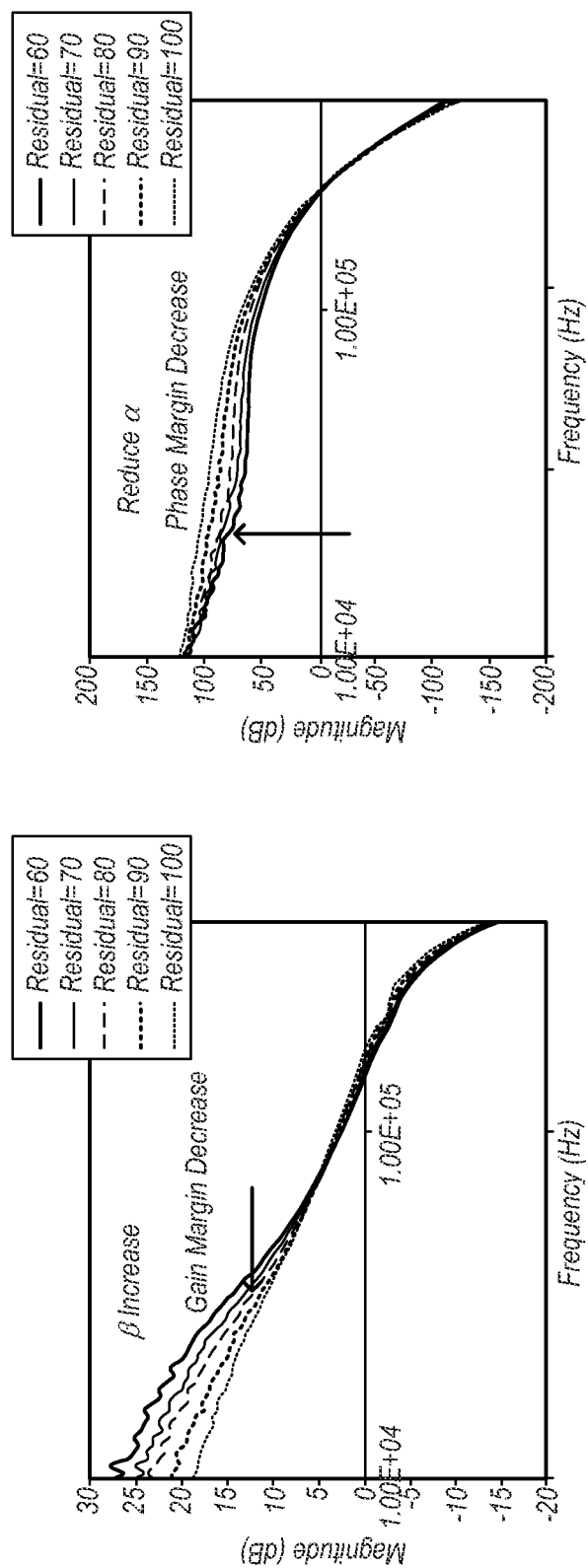
FIG. 23 shows diagrams illustrating the measured frequency response of loop gain with $\beta$ tuning at Step 2, according to some embodiments.

FIG. 23 shows a diagram illustrating measured frequency response of loop gain with tuning at the second stage of the auto-compensation process. As shown in FIG. 23, $V_{in}$=12V, $V_{out}$=1.2V, $F_{sw}$=533 kHz, L=270 nH/phase (2-phase configuration), $C_{out}$=4×100 uF POSCAP+6×100 uF ceramic, α=500, β=60, 70, 80, 90, 100 (normalized by 128).

Figure 24:
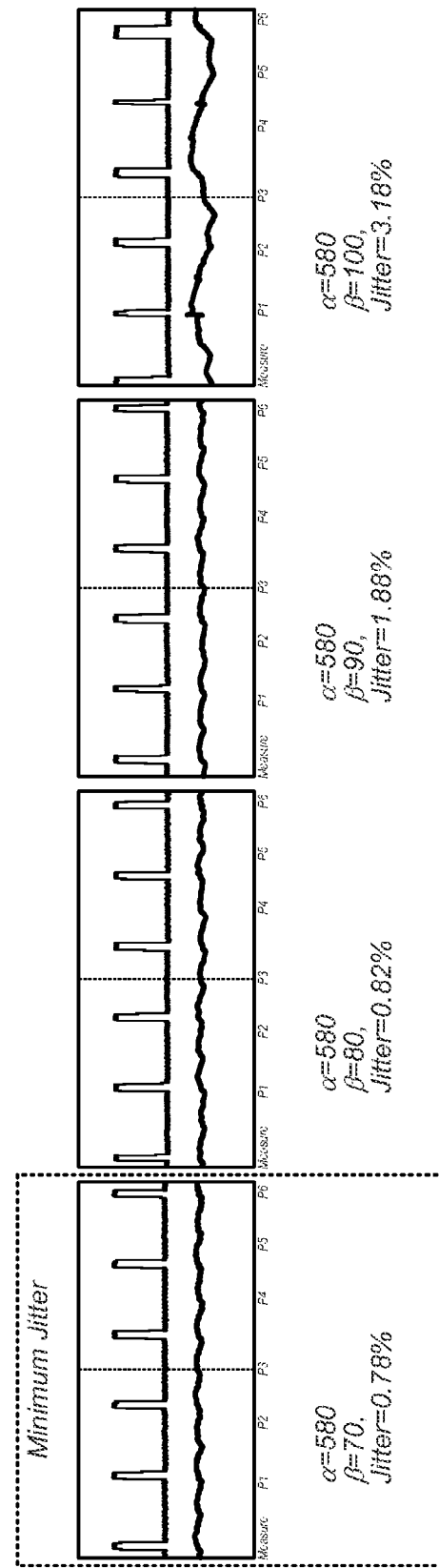
FIG. 24 shows diagrams illustrating the measured duty-cycle jitter at $\alpha$=580 and $\beta$=70, 80, 90, 100 (normalized by 128) at Step 2, according to some embodiments.

FIG. 24 shows a diagram illustrating measured duty cycle jitter at α=580 and β=70, 80, 90, 100 (normalized by 128) at the second stage of the auto-compensation process. As shown in FIG. 24, $V_{in}$=12V, $V_{out}$=1.2V, $F_{sw}$=533 kHz, L=270 nH/phase (2-phase configuration), $C_{out}$=4×100 uF POSCAP+6×100 uF ceramic. β=70 results in a desired (e.g. at or below a specified threshold) duty-cycle jitter and represents an optimum loop gain crossover slope.

Figure 25:
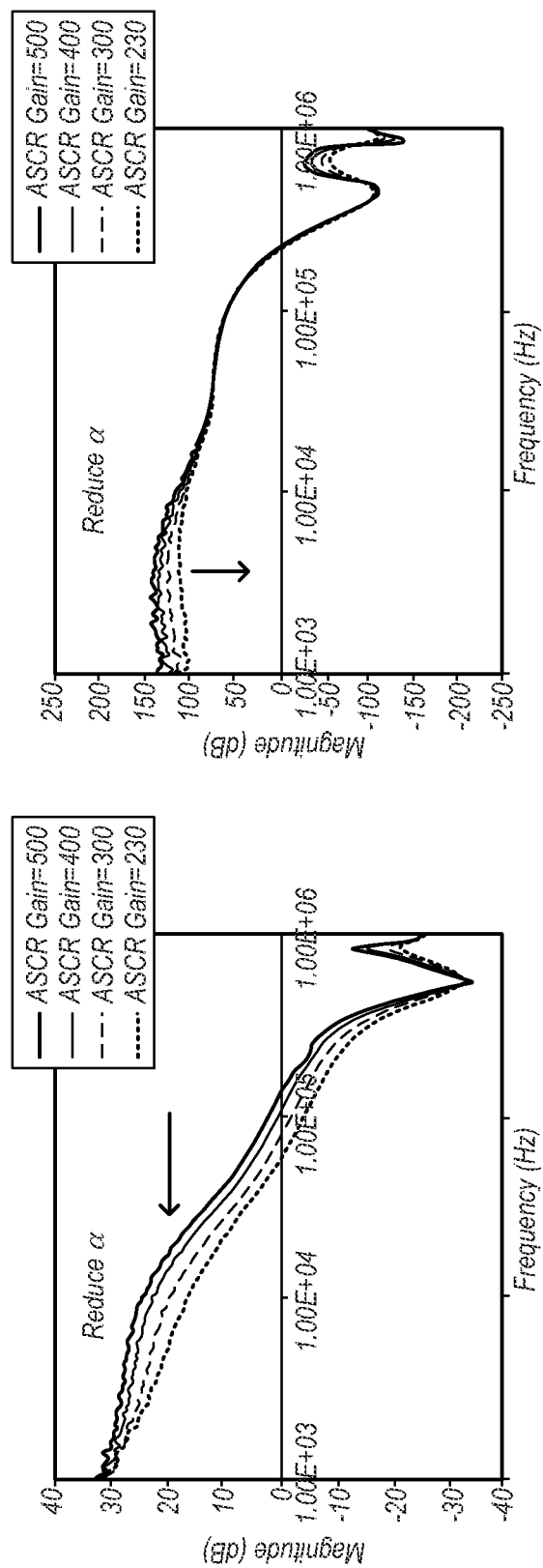
FIG. 25 shows diagrams illustrating the measured frequency response of loop gain with $\alpha$ reduction at Step 3, according to one set of embodiments.

FIG. 25 shows a diagram illustrating measured frequency response of loop gain with α reduction at the third stage of the auto-compensation process. As shown in FIG. 25, $V_{in}$=12V, $V_{out}$=1.2V, $F_{sw}$=533 kHz, L=270 nH/phase (2-phase configuration), $C_{out}$=4×100 uF POSCAP+6×100 uF ceramic, α=500, 400, 300, 230, and β=70 (normalized by 128).

Figure 26:
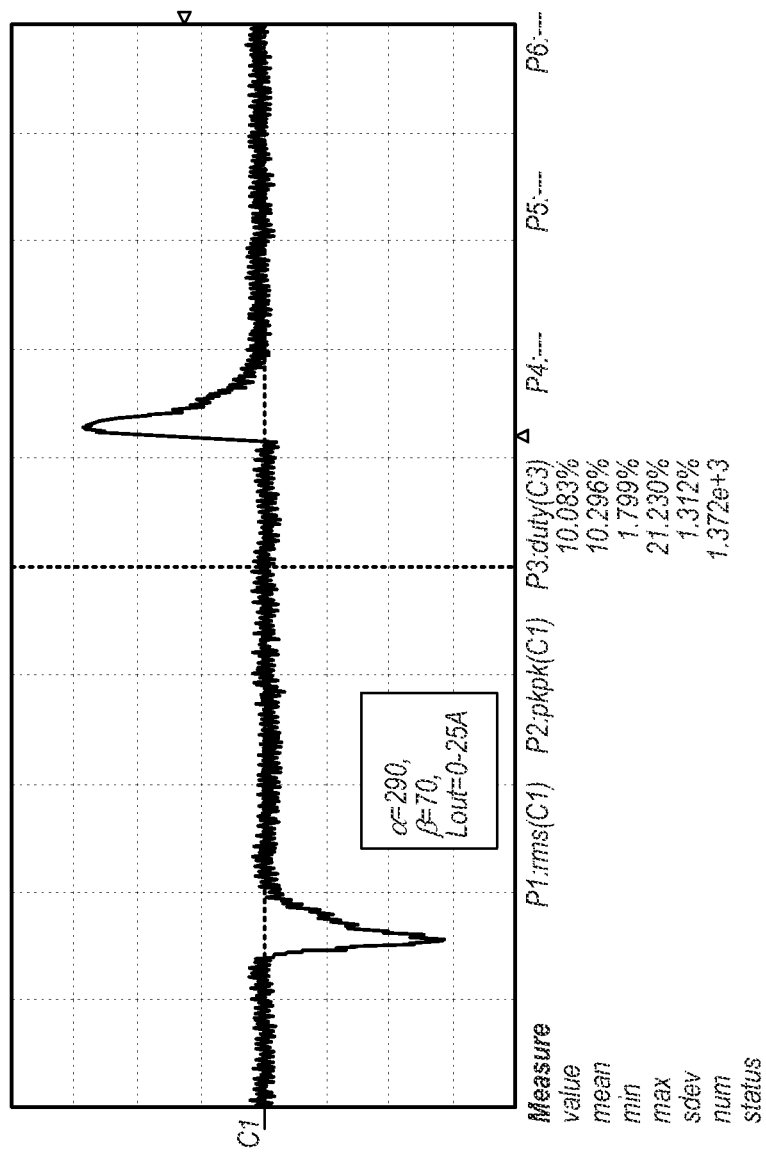
FIG. 26 shows a diagram illustrating the measured load transient response after a reduction at Step 3, according to some embodiments.

FIG. 26 shows a diagram illustrating measured load transient response after a reduction at the third stage of the auto-compensation process. As shown in FIG. 26, $V_{in}$=12V, $V_{out}$=1.2V, $F_{sw}$=533 kHz, L=270 nH/phase (2-phase configuration), $C_{out}$=4×100 uF POSCAP+6×100 uF ceramic, α=290, and β=70 (normalized by 128).

Exemplary System Embodiments with Auto-Compensation Functionality

Figure 27:
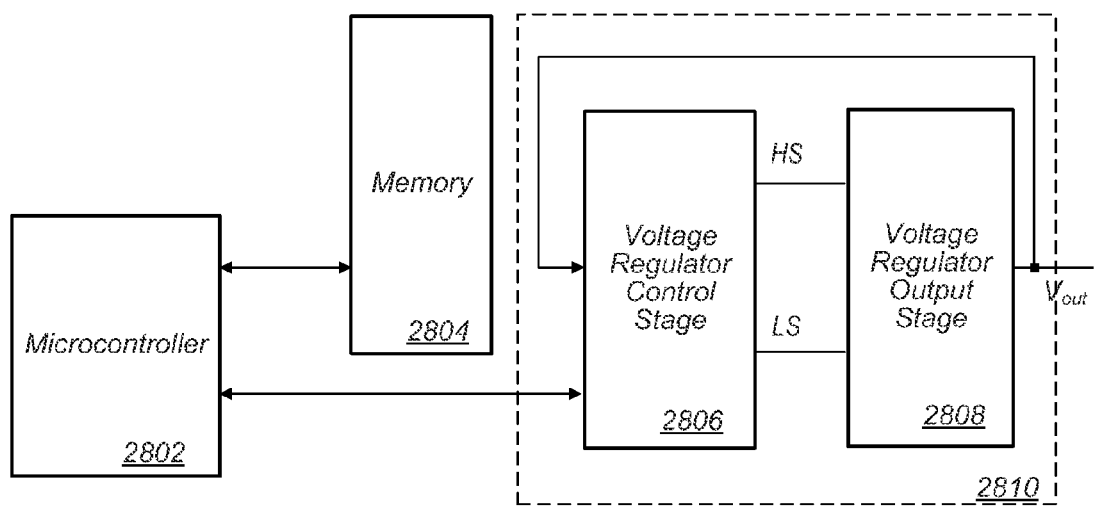
FIG. 27 shows one example of a voltage regulator system capable of performing improved auto-compensation, according to some embodiments.

Embodiments of the auto-compensation method described herein may be well suited, among others, to digital controllers that include a processor and memory. One such exemplary system is shown in FIG. 27, in which a microcontroller (processor) 2802 may interface with memory 2804, and may also interface with the voltage regulator (converter) control stage 2806 of a voltage regulator (converter) 2810. Voltage regulator control stage 2806 is used to control the output stage 2808 of voltage regulator 2810. Microcontroller 2802 may therefore operate to perform auto-compensation for voltage regulator 2810, as has previously been described above. It should also be noted that alternative embodiments to the embodiment shown in FIG. 27 are equally possible and are contemplated. For example, alternate embodiments may include application specific hardware, or a combination of hardware and software configured to perform the various functions implementing auto-compensation according to the principles described herein. The auto-compensation method may also be performed in any given application or system configuration for low output voltages (for instance 100 mV) before ramp-up to the regular output voltage (with no load applied), and/or before installation of the voltage regulator in the given system configuration or application (with load or without load, for any output voltage).

Figure 28:
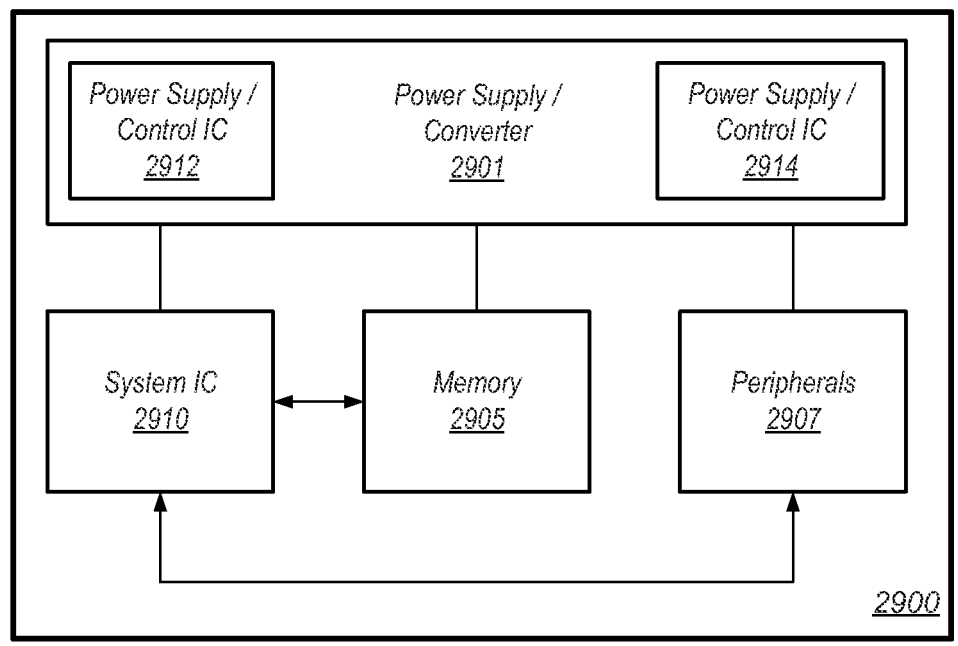
FIG. 28 shows the partial block diagram of one example of a system that includes a power supply/voltage regulator operating with auto-compensation, according to some embodiments.

Overall, various embodiments of regulators may include power supply (or power converter or voltage regulator) control circuitry designed to help optimize operation of switching regulators/supplies, including auto-compensation that obviates the need to measure state variables of the system (such as output voltage and/or current), using more reliable measurements of parameter values associated with one or more controls signals. FIG. 28 shows a block diagram of one embodiment of a system 2900 that includes a power supply 2901 designed according to the principles described herein. The system 2900 includes at least one instance of a power supply/regulator 2901 providing one or more supply voltages to the system integrated circuit (or processing element) 2910, one or more peripherals 2907 and memory subsystem (or memory) 2905. Memory 2905 may include, for example, programming instructions that may be executable by processing element 2910 to perform various system functions, which may also include controlling and/or operating peripherals 2907.

In some embodiments, more than one instance of power supply/converter 2901 may be included. Furthermore, regulator 2901 may include one or more power supply control integrated circuits, such as power supply control ICs 2912 and 2914. Power supply control ICs 2912 and 2914 may include various components such as feedback control circuitry, PWM modulation circuitry, output stage control circuitry and the like. The power supply control ICs may further perform auto-compensation according to various embodiments as preciously described herein. Furthermore, in some embodiments the control circuitry may not be included on a separate IC or ICs and may simply be a part of power supply 2901. Overall, various embodiments of power supply 2901 may be divided into two major components, the driving stage that includes high-side and low-side FETS, and the control circuitry encompassing elements performing control of the drive signals driving the FETs in the output stage. As shown in FIG. 28, the control circuitry is embodied in the form of an IC that may couple to either a driving stage (such as output control stage 136 shown in FIG. 1), or it may couple directly to high-side FET(s) and low-side FET(s) such as FETs 138 and 140 in FIG. 1. In some embodiments system 2900 may itself be a system on a chip (SOC) whereby system 2900 is an IC, with all components, including those of power supply 2901 and power supply control ICs 2912 and/or 2914 being a part of the same IC.

The peripherals 2907 may include any desired circuitry, depending on the type of system. For example, in one embodiment, the system 2900 may be included in a mobile device (e.g., personal digital assistant (PDA), smart phone, etc.) and the peripherals 2907 may include devices for various types of wireless communication, such as WiFi™, BLUETOOTH™, cellular, global positioning system, etc. The peripherals 2907 may also include additional storage, including RAM storage, solid-state storage, or disk storage. The peripherals 2907 may include user interface devices such as a display screen, including touch display screens or multi-touch display screens, keyboard or other input devices, microphones, speakers, etc. In other embodiments, the system 2900 may be included in any type of computing system (e.g. desktop personal computer, laptop, workstation, net top etc.). Furthermore, the system memory 2905 may include any type of memory.

Several embodiments of computing systems and/or electronic devices that may include all or part of system 2900, and more specifically power supply 2901 and/or Power supply control ICs 2912 and/or 2914 are illustrated in FIG.

Figure 29:
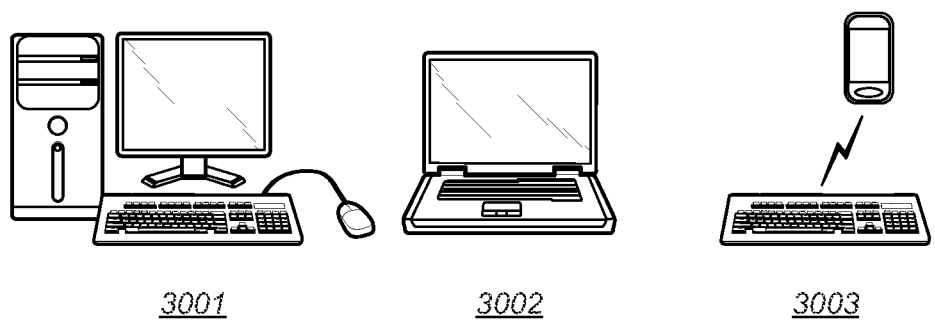
FIG. 29 shows examples of systems and devices that include of voltage regulators operating with auto-compensation, according to some embodiments.

29. System/device 3001 may represent a desktop computer, system/device 3002 may represent a laptop computer, and system/device 3003 may represent a tablet or smartphone with a wireless keyboard. System 3001 may include one or more human interface devices (HIDs), such as a keyboard, a mouse, a microphone, a camera, etc. Systems 3002 and system 3003 may include similar HIDs to system 3001. Other devices not illustrated, such as smart televisions or video game consoles may also include various forms or embodiments of a power supply or power supply controller such as those disclosed herein. It is noted that the devices/systems illustrated in FIG. 29 are merely provided as examples. Other types of systems with power supplies, voltage regulators and/or power supply or voltage regulator control ICs are possible and contemplated.

Benefits of Improved Auto-Compensation

Previous auto-compensation methods rely on the measurement of output capacitor voltage ripple, which has relatively low signal-to-noise ratio due to large switching frequency noises. In addition, the AC component of output voltage is a small signal and requires very high resolution ADCs to detect. By contrast, embodiments of various auto-compensation system and methods disclosed herein use measurements of the duty-cycle jitter to adjust compensator coefficients. Measuring duty-cycle jitter is much simpler and much more accurate than measuring state variables like output voltage ripple. Duty-cycle is a large signal and has very high signal-to-noise ratio.

Previous auto-compensation methods operate to adjust all the compensator coefficients based on a comparison of the output voltage ripple with at least two predefined thresholds. However, output voltage ripple is related to many factors such as switching frequency, input/output voltage level, output capacitance and ESRs, etc. Therefore the predefined thresholds cannot simply be constant values. In practice, these predefined thresholds are chosen adaptively according to the output voltage noise baseline, which leads to higher uncertainty and inaccuracy especially when noise baseline is too small to measure. In various embodiments disclosed herein, one pre-defined threshold is used for measuring the duty-cycle jitter. The extent of duty-cycle jitter has an approximately fixed correlation with the loop bandwidth and stability margins (phase margin/gain margin), and does not vary with switching frequency, input/output voltage level, output capacitor and ESRs. Therefore, the predefined threshold for duty-cycle jitter may be a constant ratio over the nominal duty-cycle. Using one constant predefined threshold is much more reliable and accurate than using two varying (i.e. non-constant) predefined thresholds.

Previous auto-compensation methods also fail to make provisions for searching the optimum 0 dB cross-over slope of loop gain, or, in other words, they do not make provisions for searching the optimum output capacitor ESR zero compensation, or to put it yet another way, they do not make provisions for searching the optimum high-frequency zero placement of the compensator. In various embodiments disclosed herein, the 0 dB cross-over slope of loop gain may be actively tuned to achieve a best trade-off between phase margin and gain margin. Without this procedure, the system may have too small of a phase margin with an adequate gain margin, or too small of a gain margin with an adequate phase margin under circumstances with different output capacitor ESRs. This eventually causes a bandwidth reduction and sacrificed transient performance. On the other hand, by optimally selecting the loop gain 0 dB crossover slope, phase margin and gain margin may be balanced, and the best bandwidth may be achieved, given the same stability requirement.

It should also be noted that the duty-cycle jitter measurements need not be precise. The purpose of the duty-cycle jitter measurements is to correlate the extent of duty-cycle jitter with how high the bandwidth is and how unstable the loop is. Accordingly, different methods of measuring duty-cycle jitter to achieve this purpose are possible and are contemplated. In one embodiment, the controller may set a maximum limit (upper threshold) and a minimum limit (lower threshold) to allow the duty-cycle to jitter in between. Thus, the duty-cycle jitter may be determined by choosing the maximum limit and minimum limit appropriately, and calculating the probability of hitting the maximum/minimum limit. For example, if the nominal duty-cycle is 10%, the controller may set the maximum limit to 10%*1.05 (i.e. 10.5%) and the minimum limit to 10%*0.95 (i.e. to 9.5%), where 1.05 and 0.95 are pre-defined duty-cycle jitter threshold ratios. By pushing the loop bandwidth higher and higher, jitter becomes larger and larger and the (measured) duty-cycle (value) hits the maximum/minimum limit with increased frequency, i.e. more and more frequently. If the (measured) duty-cycle (value) hits the maximum/minimum limit over a specified number of times (e.g. over 50% of the time), the duty-cycle jitter may be considered to have exceeded the predefined limit.

Various embodiments of an improved auto-compensation for voltage regulators may therefore be obtained. With loop bandwidth fixed, there exists an optimal loop 0 dB crossover slope in the frequency domain that corresponds to an operating point at which duty-cycle jitter in the time domain is at a specified level, e.g. at or below a specified threshold value. The loop 0 dB crossover slope also reflects the output capacitor ESR zero compensation. A steeper slope or a flatter slope may be indicative of unsatisfactory output capacitor ESR zero compensation (i.e. output capacitor ESR zero compensation that falls outside a desired range), which leads to either an inadequate phase margin or an inadequate gain margin. Low phase margin and/or low gain margin may cause large duty-cycle jitter in the time domain. Embodiments of the auto-compensation method described herein include a tuning step whereby the loop bandwidth may be fixed (or may be close to fixed) by changing compensator coefficients, and the 0 dB crossover slope may be adjusted such that an operation point with a specified duty-cycle jitter in the time domain (e.g. a duty-cycle jitter at or below a specified threshold value) may be determined. Therefore, this operation point corresponds to an optimum 0 dB crossover slope in the frequency domain.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the section headings used herein are for organizational purposes only and are not meant to limit the description provided herein or the claims attached hereto.

We claim:
1. A method for operating a voltage regulator, the method comprising:
controlling the voltage regulator at least according to a compensation function, wherein the voltage regulator generates a regulated output voltage at least according to a control signal, wherein said controlling comprises:

initializing one or more coefficients of the compensation function, wherein the one or more coefficients together correspond to a loop gain and respective positions of compensation zeros defined by the compensation function;

measuring, subsequent to said initializing, a deviation of an instantaneous value of a parameter of the control signal from a nominal value of the parameter; and adjusting the one or more coefficients of the compensation function according to said measuring the deviation of the instantaneous value of the parameter.

2. The method of claim 1, wherein the control signal is a pulse-width modulated (PWM) signal, and wherein the parameter of the control signal is a duty-cycle of the PWM signal.

3. The method of claim 1, further comprising:
providing, by the voltage regulator, a regulated output voltage according to the adjusted one or more coefficients of the compensation function.

4. The method of claim 1, further comprising:
obtaining at least a specified number of measurements of a steady state value of the parameter; and
setting the nominal value of the parameter to an average steady state value of the parameter obtained from the at least a specified number of measurements of the steady state value of the parameter.

5. The method of claim 4, further comprising:
determining a maximum threshold value of the parameter and a minimum threshold value of the parameter according to the nominal value of the parameter and a predefined magnitude of the deviation.

6. The method of claim 5, further comprising:
increasing a bandwidth associated with the compensation function, comprising adjusting one or more of the one or more coefficients of the compensation function until the instantaneous value of the parameter reaches either the maximum threshold value or the minimum threshold value with a predefined probability.

7. The method of claim 6, further comprising:
obtaining a different 0 dB crossover roll off rate of the loop gam, comprising adjusting one or more of the one or more coefficients of the compensation function with approximately fixed bandwidth.

8. The method of claim 7, further comprising:
adjusting one or more of the one or more the coefficients of the compensation function to have respective values that result in a specified deviation of the instantaneous value of the parameter.

9. The method of claim 8 further comprising:
obtaining a specified percentage loop gain/bandwidth reduction, comprising adjusting one or more of the one or more coefficients of the control function.

10. An auto-compensation controller for controlling a voltage regulator configured to generate a regulated output voltage, the auto-compensation controller comprising:
a control circuit configured to perform a compensator function at least according to a plurality of coefficients, and further configured to adjust a control parameter of a control signal at least according to the plurality of coefficients;
a control signal generator configured to generate the control signal at least according to the control parameter, and regulate the output voltage at least according to the control signal; and a digital controller configured to:
determine a deviation of an instantaneous value of the control parameter from a specified value of the control parameter; and
adjust the plurality of coefficients according to the deviation of the instantaneous value of the control parameter.

11. The auto-compensation controller of claim 10, further comprising a memory circuit configured to store the plurality of coefficients.

12. The auto-compensation controller of claim 10, further comprising:
a correction circuit configured to generate an error value based on a reference voltage and the regulated output voltage, wherein the compensator function is configured to generate the control parameter at least based on the error value.

13. The auto-compensation controller of claim 10, wherein the digital controller is further configured to:
measure a steady state value of the control parameter;
determine a nominal average value of the control parameter at least according to the measured steady state value of the control parameter; and
use the nominal average value of the control parameter as the specified value of the control parameter.

14. The auto-compensation controller of claim 13, wherein the digital controller is further configured to:
determine a threshold value of the control parameter based at least on the nominal average value of the control parameter and a predefined value of the deviation of the instantaneous value of the control parameter; and
adjust at least a first coefficient of the plurality of coefficients until the instantaneous value of the control parameter reaches the threshold value with a predefined probability.

15. The auto-compensation controller of claim 14, wherein the digital controller is further configured to:
adjust at least a second coefficient of the plurality of coefficients within a specified range until the deviation of the instantaneous value of the control parameter reaches a specified value.

16. A voltage regulator comprising:
an output stage circuit configured to provide a regulated output voltage;
a driver circuit configured to provide drive signals to the output stage to generate the regulated output voltage;
a pulse-width modulation (PWM) circuit configured to generate a PWM signal having a duty-cycle, wherein the driver circuit is configured to provide the drive signals according to the PWM signal; and
control circuitry configured to control a bandwidth and a loop gain of the voltage regulator at least according to a deviation of an instantaneous value of the duty-cycle of the PWM signal from a specified value of the duty-cycle of the PWM signal.

17. The voltage regulator of claim 16, wherein the control circuitry is configured to:
adjust a plurality of coefficients of a compensation function at least according to the deviation of the instantaneous value of the duty-cycle of the PWM signal; and
control the bandwidth and the loop gain at least according to the compensation function.

18. The voltage regulator of claim 17, wherein to adjust the plurality of coefficients, the control circuitry is configured to perform the following during a first auto-compensation stage:

fix at least a first coefficient of the plurality of coefficients; and adjust a second coefficient of the plurality of coefficients until the instantaneous value of the duty-cycle of the PWM signal has a predefined probability of reaching a specified duty-cycle threshold value.

19. The voltage regulator of claim 18, wherein to adjust the plurality of coefficients, the control circuitry is configured to perform the following during a second auto-compensation stage subsequent to the first auto-compensation stage:

fix the second coefficient; and adjust the first coefficient within a specified range until the deviation of the instantaneous value of the duty-cycle of the PWM signal reaches a specified threshold value.

20. The voltage regulator of claim 19, wherein to adjust the plurality of coefficients, the control circuitry is configured to perform the following during a third auto-compensation stage subsequent to the second auto-compensation stage:

fix the first coefficient; and adjust the second coefficient until at least one of the loop gain and the bandwidth is reduced by a specified amount.

* * * * *